United States Patent
Iversen et al.

(10) Patent No.: US 10,533,138 B2
(45) Date of Patent: Jan. 14, 2020

(54) RECOVERY SYSTEM FOR HIGH PRESSURE PROCESSING SYSTEM

(71) Applicant: Steeper Energy ApS, Hørsholm (DK)

(72) Inventors: Steen Brummerstedt Iversen, Vedbæk (DK); Julie Katerine Rodriguez Guerrero, Calgary (CA); Andrew Ironside, Calgary (CA)

(73) Assignee: STEEPER ENERGY APS, Hørsholm (DK)

( * ) Notice: Subject to any disclaimer, the term of this patent is extended or adjusted under 35 U.S.C. 154(b) by 0 days.

(21) Appl. No.: 16/185,672

(22) Filed: Nov. 9, 2018

(65) Prior Publication Data
US 2019/0144757 A1 May 16, 2019

(30) Foreign Application Priority Data
Nov. 10, 2017 (DK) .................................. 201770844

(51) Int. Cl.
*C10G 1/00* (2006.01)
*C10G 1/02* (2006.01)
(Continued)

(52) U.S. Cl.
CPC ............. *C10G 1/006* (2013.01); *C10G 1/002* (2013.01); *C10G 1/02* (2013.01); *C10G 1/045* (2013.01);
(Continued)

(58) Field of Classification Search
CPC .......... C10G 1/00; C10G 1/002; C10G 1/006; C10G 1/02; C10G 1/045; C10G 1/047; C10G 1/10; C10G 3/00; C10G 3/42
(Continued)

(56) References Cited

U.S. PATENT DOCUMENTS

| 4,152,248 A | 5/1979 | Feder et al. |
| 4,266,083 A | 5/1981 | Huang |

(Continued)

FOREIGN PATENT DOCUMENTS

| EP | 0204354 B1 | 5/1990 |
| EP | 1184443 A1 | 3/2002 |

(Continued)

OTHER PUBLICATIONS

Iggland, M. et. al. "Introduction to Chemical Engineering for Lecture 7: Flash Distillation" (2015), pp. 1-10. (Year: 2015).*

(Continued)

*Primary Examiner* — Youngsul Jeong
(74) *Attorney, Agent, or Firm* — Birch Stewart Kolasch & Birch LLP

(57) ABSTRACT

Products from a high pressure processing system are separated and purified. The processing system is adapted for pressurizing and heating a feed mixture comprising carbonaceous material(-s) in the presence of homogeneous catalysts and liquid organic compounds to produce a converted feed mixture. The converted feed mixture is cooled and depressurized, and then separated into: a gas phase, an oil phase, and a water phase comprising liquid organic compounds and dissolved homogeneous catalysts comprising potassium and/or sodium. The liquid organic compounds and dissolved homogenous catalysts are at least partly recovered from said water phase, thereby producing a first water phase stream enriched in liquid organic compounds and homogeneous catalysts and a second water phase stream depleted in liquid organic compounds and homogeneous catalysts. The first water phase is at least partly recycled to the feed mixture, with a bleed stream being withdrawn therefrom prior to recycling.

34 Claims, 14 Drawing Sheets

(51) Int. Cl.
*C10G 1/04* (2006.01)
*C10G 1/10* (2006.01)

(52) U.S. Cl.
CPC .............. *C10G 1/047* (2013.01); *C10G 1/10* (2013.01); *C10G 2300/1003* (2013.01); *C10G 2300/1014* (2013.01)

(58) Field of Classification Search
USPC ........................................................ 585/240
See application file for complete search history.

(56) References Cited

U.S. PATENT DOCUMENTS

| | | | |
|---|---|---|---|
| 4,935,567 | A | 6/1990 | Yokoyama et al. |
| 5,948,275 | A | 9/1999 | Djafer et al. |
| 9,212,317 | B2 | 12/2015 | Iversen |
| 9,758,728 | B2 | 9/2017 | Elliott et al. |
| 2006/0260186 | A1* | 11/2006 | Iversen .................. C10G 1/08 44/605 |
| 2013/0055623 | A1 | 3/2013 | Iversen |
| 2014/0099691 | A1* | 4/2014 | Iversen .................. C10G 1/02 435/166 |
| 2016/0304757 | A1* | 10/2016 | Feng .................. C08G 8/38 |
| 2018/0066193 | A1 | 3/2018 | Iversen |

FOREIGN PATENT DOCUMENTS

| | | |
|---|---|---|
| WO | WO 81/00855 A1 | 4/1981 |
| WO | WO 2006/117002 A2 | 11/2006 |
| WO | WO 2009/015409 A1 | 2/2009 |
| WO | WO 2009/134872 A2 | 11/2009 |
| WO | WO 2012/167791 A2 | 12/2012 |
| WO | WO 2014/197928 A1 | 12/2014 |
| WO | WO 2015/092773 A1 | 6/2015 |
| WO | WO 2015/169319 A1 | 11/2015 |
| WO | WO-2015169319 A1 * | 11/2015 .............. C10G 1/008 |

OTHER PUBLICATIONS

"Distillation Fundamentals", (Apr. 16, 2017); pp. 1-9 (Year: 2017).*
Brown et al., "Chloride Removal from Kraft Liquors Using Ion Exchange Technology," TAPPI Environmental Conference, Vancouver, B.C., Canada, Apr. 1998 (Apr. 1, 1998), pp. 1-12, XP055538773.

* cited by examiner

RECOVERY SYSTEM FOR HIGH PRESSURE PROCESSING SYSTEM

FIELD OF THE INVENTION

The present invention relates to the area of separation systems for use in high pressure continuous processing systems, in particular recovery systems for recovering liquid organic compounds and/or homogeneous catalysts from a separated water phase product from high pressure continuous processing systems for conversion of carbonaceous materials such as biomass.

BACKGROUND OF THE INVENTION

Numerous applications of high pressure continuous processes exist or are under development or in early stages of commercialization. Examples of such processes are hydrothermal and insolvothermal processes e.g. for production of hydrocarbons such as transportation fuels, lubricants or speciality chemicals and gases from carbonaceous materials such as biomass.

The products from the high pressure conversion process typically comprises a pressurized mixture of liquid hydrocarbon compounds; a gas phase comprising carbon dioxide, carbon monoxide, hydrogen, $C_1$-$C_4$ hydrocarbons; a water phase comprising water phase liquid organic compounds and dissolved salts, and optionally suspended solids such as inorganics and/or char and/or unconverted carbonaceous material depending on the specific carbonaceous material being processed and the specific processing conditions.

Various separation techniques are known in the art of oil production. In the area of application of such on hydrocarbons produced from carbonaceous material by use of hydrothermal or solvothermal processes the information on separation is limited. Hydrocarbons produced in this manner will have some characteristics similar to fossil hydrocarbons and will further differ in other areas. The so produced hydrocarbons will, compared to fossil oils, typically be more polarized, have a high viscosity due to a relatively high oxygen content and often show a density close to the density of water. Use of conventional separation methods known from the fossil oil applications on the so produced hydrocarbons has shown that the hydrocarbons after such separation contain too much water and/or too many inorganics for many applications.

Typical the product stream from the high pressure conversion process is depressurized to ambient conditions and cooled to a temperature below the boiling point of water to allow for subsequent separation into the individual phases. However, whereas different techniques have been generically proposed for separation the individual phases including solvent extraction (Downie (WO 2014/197928)), distillation (Downie (WO 2014/197928)), cyclones such as hydrocyclones (Iversen (U.S. Pat. No. 9,212,317-B2), Humfreys (WO2008AU00429), Annee, (EP0204354), Van de Beld (EP1184443)), filtration (Iversen (WO2015/092773), Iversen (U.S. Pat. No. 9,212,317-B2), Annee (EP0204354), Downie (WO 2014/197928), Iversen (WO 2006/117002)), decanting (Yokoyama (U.S. Pat. No. 4,935,567), Modar (WO 81/00855)), centrifugation (Iversen (WO2015/092773), Iversen (U.S. Pat. No. 9,212,317-B2), Iversen (WO2006/117002), Annee (EP0204354)) membrane separation (Modar (WO81/00855), Iversen (WO2006/117002)), only limited details as to the equipment design and separation conditions and operation have been disclosed in the prior art.

For continuous processing water must be extracted from the process in same amount as it is added to the process with the carbonaceous material(-s), catalysts etc. The water phase resulting from such separation processes generally also comprises water phase liquid organic compounds as well as dissolved salts such as homogeneous catalysts in the form of potassium and/or sodium salts and/or suspended solids as well as other components, and requires purification in order to meet environmental standards for the effluent. Besides representing an environmental problem the water phase liquid organic compounds represents a loss of carbon that reduces the oil phase liquid hydrocarbon yield. Elliott et al (U.S. Pat. No. 9,758,728) applies a combined hydrothermal liquefaction and catalytic hydrothermal gasification system to increase overall carbon yields, where the water phase liquid organic compounds are reduced by hydrothermal gasification and converted into a medium-BTU product gas that may be used for process heating. Further purification is proposed by recycling the water phase and/or a solids fraction to the growth stage such as production of algae. However, though the teaching of Elliott et al increases the overall carbon yield, it is achieved via a by-product and the yield of the desired oil phase liquid hydrocarbon product remains unchanged. Further Elliott et al is silent about recovery of homogeneous catalysts in the form of potassium and sodium.

It is desirable to recover both water phase liquid organic compounds as well homogeneous catalysts such as potassium and sodium from the water phase for efficiency as well as economic reasons. Very little information of suitable systems for such recovery and recycling to the feed preparation are disclosed in the prior art.

Iversen (U.S. application Ser. No. 15/787,393) discloses a recovery process, where water phase liquid organic compounds and/or homogeneous catalysts are recovered from the water phase using an evaporation and/or distillation technique.

Although this to some extent provides for a recovery of some of the desired components there are other components that may require purifying in particular the water liquid organic phase.

A general problem of such prior art separation systems is that the separated oil product often contains too high levels of water and inorganics, which limits the quality of the oil (hydrocarbons) and its further use in e.g. catalytic upgrading processes to transportation fuels, lubricants or speciality chemicals.

A general problem in such prior art separation systems is that the water phase often contains too high level of built up contaminants, such as e.g. chlorides, that may have negative effects on the process and the process equipment and as such directly or indirectly may influence the yield obtainable from the process, the quality of the product produced and/or the lifetime of the process equipment.

Accordingly, improved and more efficient separation schemes for purifying/reducing contaminants such as chlorides from the water phase are desirable.

OBJECTIVE OF THE INVENTION

The object of the present invention is therefore to provide for an improved separation and purification system as well as a method of operating such system that at least partly recovers water phase liquid organic compounds and homogeneous catalysts in the form of potassium and/or sodium, before re-introducing these to the feed slurry preparation step.

DESCRIPTION OF THE INVENTION

According to one aspect of the present invention the objective of the invention is achieved through a method of separating and purifying products from a high pressure processing system adapted for processing a feed mixture comprising carbonaceous material(-s) at a pressure of from about 150 bar to about 400 bar and a temperature from about 300° C. to about 430° C. in the presence of homogeneous catalysts in the form of potassium and/or sodium in a concentration of at least 0.5% by weight and liquid organic compounds in a concentration from about 5% to about 40% by weight in a predefined time thereby producing a converted feed mixture, wherein the converted feed mixture is cooled to a temperature in the range 50° C. to 250° C., and depressurized to a pressure in the range 1 to 150 bar, and where the converted feed mixture is separated in to a gas phase comprising carbon dioxide, hydrogen, and methane, an oil phase comprising oil phase liquid organic compounds, and a water phase comprising water phase liquid organic compounds, dissolved salts and optionally suspended particles, where the water phase liquid organic compounds and dissolved homogenous catalysts in the form of potassium and/or sodium are at least partly recovered from said water phase thereby producing a first water phase stream enriched in water phase liquid organic compounds and homogeneous catalysts in the form of potassium and sodium, and a second water phase stream depleted in water phase liquid organic compounds and homogeneous catalysts in the form of potassium and sodium, where the first water phase is at least partly recycled to said the feed mixture to provide at least part of said liquid organic compounds and homogeneous catalysts in the feed mixture, and where further a bleed stream is withdrawn from said water phase enriched in water phase liquid organic compounds and homogeneous catalysts in the form of potassium and sodium prior to recycling said first recycle stream to the feed mixture.

By withdrawing such bleed stream from the first water phase stream being enriched in water phase liquid organic compounds and homogeneous catalysts in the form of potassium and sodium, it is avoided that trace elements such as chloride accumulates in the water phase due to said recycling. Whereas other trace elements such as multivalent metal ions are less soluble in the water phase and may be removed from the process as solids, this is not the case for chloride that has a high solubility in water and further enhances corrosion.

In a further preferred embodiment the liquid organic compounds in the feed mixture further comprises recycled oil phase liquid organic compounds.

Typically, the weight ratio of said bleed stream being withdrawn from the first water phase stream being enriched in water phase liquid organic compounds and homogeneous catalysts in the form of potassium and sodium to the total water phase stream fed to said recovery system in the range 0.01 to 0.5 such as in the range 0.02 to 0.4, preferably the weight ratio of said bleed stream being withdrawn to the total water phase stream is in the range 0.03 to 0.25 such as in the range 0.04 to 0.15.

By withdrawing a bleed stream in the above weight ratio ranges it is obtained that the chloride concentration in the water phase is controlled to acceptable concentrations.

In a preferred embodiment the amount of bleed being withdrawn is selected so as to obtain a concentration of chloride in the feed mixture of less than 600 ppm by weight such as less than 400 ppm by weight; preferable less than 200 ppm by weight such as less than 100 ppm by weight.

In an advantageous embodiment of the present invention the bleed stream is further treated in one or more ion exchange step(-s).

According to a preferred embodiment the one or more ion exchange step(-s) comprises one or more ion exchange resins contained in one or more fixed bed(-s) in a parallel arrangement with shut off valves prior and after each bed so that at least one ion exchange bed is online and at least one ion exchange bed is offline.

Advantageously ion exchange resins in said ion exchanger step comprises a chloride selective resin.

Advantageously the concentration of chloride in the first water phase is less than 250 ppm by weight such as less than 200 ppm by weight; preferably the concentration of chloride in the first water phase is less than 150 ppm by weight such as less than 100 ppm by weight.

The bleed stream may according to a preferred embodiment of the invention be filtered to remove suspended particles prior to entering said ion exchange step(-s).

According to a further preferred embodiment of the present invention, the ion exchange bed(-s) are further equipped with a valve arrangement allowing for regeneration/cleaning of said ion exchangers by providing a back flow and/or a back flush with a cleaning fluid while being offline.

In an advantageous embodiment the cleaning fluid comprises demineralized water.

The pH at the inlet of the ion exchanger step(-s) is according to a preferred embodiment of the present invention maintained in the range 8 to 14 such as in the range 9 to 14, preferably the pH at the inlet of the ion exchanger is in the range 10 to 13.5.

The maintaining of the pH at the inlet may according to an embodiment of the present invention be performed by measuring the pH of the bleed stream prior to entering the ion exchanger step(-s), and eventually adding a base such as sodium hydroxide to the bleed stream prior to entering the ion exchanger step(-s) to or may be added upstream the bleed treatment step e.g. by adding a base such as sodium hydroxide in the recovery step.

The water phase entering the recovery system according to the present invention generally comprises water phase liquid organic compounds having a boiling point lower than water and water phase liquid organic compounds having a boiling point higher than water.

The water phase liquid organic compounds being recovered and introduced to the feed preparation step according to the present invention typically comprises one or more components selected from one or more of the groups:

a. Ketones such as acetone, propanones, butanones, penthanones, penthenones, cyclopentanones such as 2,5 dimethyl cyclopentanone, cyclopentenones, hexanones and cyclohexanones such as 3-methyl hexanone, quinones b. Alcohols and poly-alcohols such as methanol, ethanol, propanols, buthanols, penthanols, hexanols, heptanols, octanols such as 2-butyl-1-octanol, hydroquinones, benzene diols c. Phenols, alkylated phenols, poly-phenols, monomeric and oligomeric phenols, creosol, thymol, alkoxy phenols, p-coumaryl alcohol, coniferyl alcohol, sinapyl alcohol, flavenols, catechols d. Carboxylic acids such as formic acid, acetic acid and phenolic acids like ferric acid, benzoic acids, coumarin acid, cinnamic acid, abietic acid, oleic acid, linoleic acid, palmetic acid, steric acid
e. Furans such as tetrahydrofuran (THF)
f. Alkanes, alkenes, toluene, cumene The concentration of individual water phase liquid organic compounds produced by the process in the water phase entering the recovery system is often less than 2.0% by weight such as less than 1.0% by weight.

However, in some embodiments of the present invention such as where further water phase liquid organic compounds such as alcohols or phenols are added to the feed mixture, the concentration of individual water phase liquid organic compound in the water phase entering the recovery system may be up to 40% by weight such as up to 30% by weight, preferably up to 20% by weight such as in the range 5 to 20% by weight.

The water phase liquid organic compounds may according to the present invention also comprise emulsified droplets of the oil phase.

Advantageously the recovery of water phase liquid organic compounds and homogenous catalysts in the form of potassium and/or sodium from the water phase comprises one or more techniques selected among evaporation, distillation/fractionation, reverse osmosis, nanofiltration, ultrafiltration and pervaporation.

Often the recovery of water phase liquid organic compounds and homogenous catalysts in the form of potassium and/or sodium from the water phase comprises one or more evaporation and/or distillation steps thereby providing a first water phase enriched in water phase liquid organic compounds and homogenous catalysts in the form of potassium and/or sodium ("concentrate") and a second water phase stream depleted in water phase liquid organic compounds and homogenous catalysts in the form of potassium and/or sodium ("distillate"), where the amount of second water phase produced is selected so that it corresponds to the amount of water entering the high pressure processing system such as contained in the one or more carbonaceous feed stocks.

The water phase entering the recovery system may according to an embodiment of the present invention be filtered so as to remove suspended solid particles prior to entering said one or more evaporation and/or distillation steps.

Often the recovery system further comprises one or more flash steps.

The pH of the water phase in the recovery system is preferably maintained at alkaline conditions such as at a pH in the range 7 to 14 such as in the range 9-14, preferable the pH is maintained in the range 10 to 14 such as in the range 10 to 13. Said maintaining at alkaline conditions often comprises measuring and adjusting the pH by adding sodium hydroxide to the water phase.

Advantageously the evaporated vapor is contacted with an absorbent in an absorber prior to said condensation steps. Said absorber may comprise an alkaline absorbent such as sodium hydroxide. The sodium hydroxide added in said absorber may constitute the sodium hydroxide added to the water phase so as to maintain the pH in the desired pH ranges in the recovery step and/or in the bleed treatment step described above.

By maintaining the pH in the recovery system and/or in the absorber step in the above specified ranges it is obtained that the concentration of phenols in the distillate fraction is reduced.

A preferred embodiment the recovery system comprises at least one evaporator such as a falling film evaporator. Preferably the evaporated vapor in said evaporation step is condensed in at least two condensation steps having a decreasing temperature. Often the evaporated vapor passes a demister and/or a coalescer prior to said condensation step(-s).

The recovery system may according to an advantageous embodiment of the present invention comprise one or more distillation column(-s) comprising a a stripping and a rectifying section.

The one or more carbonaceous feedstock is selected from biomass such as woody biomass and residues such as wood chips, saw dust, forestry thinnings, road cuttings, bark, branches, garden and park wastes & weeds, energy crops like coppice, willow, miscanthus, and giant reed; agricultural and by products such as grasses, straw, stems, stover, husk, cobs and shells from e.g. wheat, rye, corn rice, sunflowers; empty fruit bunches from palm oil production, palm oil manufacturers effluent (POME), residues from sugar production such as bagasse, vinasses, molasses, greenhouse wastes; energy crops like miscanthus, switch grass, sorghum, jatropha; aquatic biomass such as macroalgae, microalgae, cyano bacteria; animal beddings and manures such as the fiber fraction from livestock production; municipal and industrial waste streams such as black liquor, paper sludges, off spec fibres from pulp & paper production; residues and by-products from food production such as juice or wine production; vegetable oil production, sorted municipal solid waste, source sorted household wastes, restaurant wastes, slaughter house waste, sewage sludge, plastics and combinations thereof. By applying such method for separation compared to previously known methods it is avoided that undesired components build up in the system and implies undesired effects on the process and the process system.

It should be noted that the method is defined as comprising separating the product mixture in gas phase, an oil phase (liquid hydrocarbon), and a water phase comprising water phase liquid organic compounds, dissolved salts and optionally suspended particles. This means that the phases comprises essentially gas, liquid hydrocarbon and water, but also other components, where the subsequent separation process serves the purpose of further purifying in particular the liquid hydrocarbon phase.

BRIEF DESCRIPTION OF THE DRAWINGS

The invention will in the following be described with reference to one embodiment illustrated in the drawings where.

DESCRIPTION OF A PREFERRED EMBODIMENT

Figure 1:
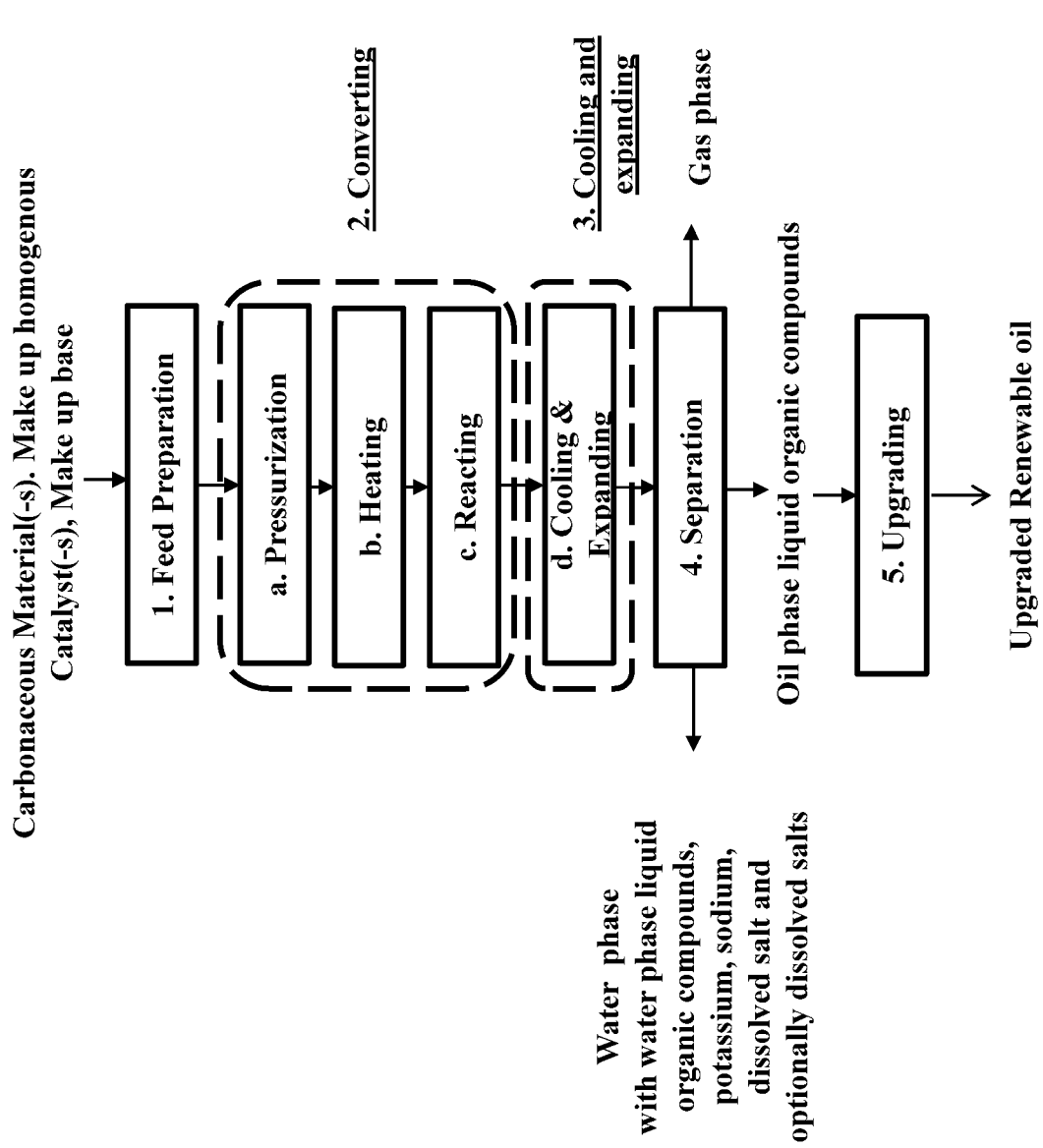
FIG. 1 shows a schematic overview of an embodiment of a continuous high pressure process for transforming carbonaceous materials into renewable oil phase liquid organic compounds.

FIG. 1 shows an embodiment of a continuous high pressure production process for conversion of carbonaceous materials such as biomass to renewable oil comprising:
1. A feed mixture preparation step
2. A conversion step comprising the steps of
   a. Pressurizing
   b. Heating
   c. Reacting
3. Cooling & pressure reduction
4. Separation
5. Upgrading 1. Feed Preparation The first step of the process is to prepare a feed mixture in the form of pumpable slurry of the carbonaceous material (1). This generally includes means for size reduction and slurrying such as dispersing the organic matter with other ingredients such as water, catalysts and other additives such as organics in the feed mixture, A carbonaceous material according to the present invention may be in a solid form or may have a solid appearance, but may also be in the form of a sludge or a liquid. Further the carbonaceous material(-s) may be contained in one or more input streams.

Non limiting examples of carbonaceous feedstock according to the present invention include biomass such as woody biomass and residues such as wood chips, saw dust, forestry thinnings, road cuttings, bark, branches, garden and park wastes & weeds, energy crops like coppice, willow, miscanthus, and giant reed; agricultural and byproducts such as grasses, straw, stems, stover, husk, cobs and shells from e.g. wheat, rye, corn rice, sunflowers; empty fruit bunches from palm oil production, palm oil manufacturers effluent (POME), residues from sugar production such as bagasse, vinasses, molasses, greenhouse wastes; energy crops like miscanthus, switch grass, sorghum, jatropha; aquatic biomass such as macroalgae, microalgae, cyano bacteria; animal beddings and manures such as the fiber fraction from livestock production; municipal and industrial waste streams such as black liquor, paper sludges, off spec fibres from paper production; residues and byproducts from food production such as juice or wine production; vegetable oil production, sorted municipal solid waste, source sorted house wastes, restaurant wastes, slaughter house waste, sewage sludge and combinations thereof.

Many carbonaceous materials according to the present invention are related to lignocellulose materials such as woody biomass and agricultural residues. Such carbonaceous materials generally comprise lignin, cellulose and hemicellulose.

An embodiment of the present invention includes a carbonaceous material having a lignin content in the range 1.0 to 60% by weight % by weight such as lignin content in the range 10 to 55% by weight. Preferably the lignin content of the carbonaceous material is in the range 15 to 40% by weight such as 20-40% by weight.

The cellulose content of the carbonaceous material is preferably in the range 10 to 60% by weight such as cellulose content in the range 15 to 45% by weight. Preferably the cellulose content of the carbonaceous material is in the range 20 to 40% by weight such as 30-40% by weight.

The hemicellulose content of the carbonaceous material is preferably in the range 10 to 60% by weight such as cellulose content in the range 15 to 45% by weight. Preferably the cellulose content of the carbonaceous material is in the range 20 to 40% by weight such as 30-40% by weight.

Depending on the specific organic matter being transformed and how it is received, the size reduction may be conducted in one or more steps e.g. the carbonaceous material may be treated as is and subsequently mixed with other ingredients in the same step or it may be pre-grinded to a size suitable for further processing and size reduction in the mixing step. Often the carbonaceous material is size reduced to a particle size less than 15 mm such as a particle size of less than 10 mm the pre-grinding step; preferably to a particle size of less than 5 mm such as less than 3 mm.

The pre-grinding may according to an embodiment of the present invention be performed using a shredder, cutting mill, hammer mill, pan grinder, impeller mill or a combination thereof.

Advantageously the pre-grinding step may further comprise means for removal of impurities such as metals, stones, dirt like sand, and/or to separate off spec fibres from the carbonaceous material with particle size with said maximum size. Such means may comprise magnetic separation, washing, density separation such as flotation, vibration tables, acoustic separators, sieving and combinations thereof. Said means may be present prior to the pre-grinding step and/or after the pre-grinding step.

The carbonaceous material is subsequently mixed with other ingredients of the feed mixture. Other ingredients may include:

1. Recycled oil (hydrocarbons) produced by the process or a fraction of the oil (hydrocarbon produced by the process; preferably in a weight ratio to dry ash free organic matter in the range 0.5 to1.5 such as a ratio 0.8 to 1.2; The recycled oil may comprise phenols, alkylated phenols, polyphenols, monomeric and oligomeric phenols, creosol, thymol, alkoxy phenols, p-coumaryl alcohol, coniferyl alcohol, sinapyl alcohol, flavenols, catechols.

2. Recycled concentrate of the water phase from the process comprising recovered homogeneous catalyst and water soluble organics such as one or more components selected from a. Ketones such as acetone, propanones, butanones, penthanones, penthenones, cyclopentanones such as 2,5 dimethyl cyclopentanone, cyclopentenones, hexanones and cyclohexanones such as 3-methyl hexanone, quionones etc.

b. Alcohols and poly-alcohols such as methanol, ethanol, propanols (incl isopropanol), buthanols, penthanols, hexanols, heptanols, octanols such as 2-butyl-1-octanol, hydroquinones, benzene diols etc.

c. Phenols, alkylated phenols, poly-phenols, monomeric and oligomeric phenols, creosol, thymol, alkoxy phenols, p-coumaryl alcohol, coniferyl alcohol, sinapyl alcohol, flavenols, catechols d. Carboxylic acids such as formic acid, acetic acid and phenolic acids like ferric acid, benzoic acids, coumarin acid, cinnamic acid, abietic acid, oleic acid, linoleic acid, palmetic acid, steric acid e. Furans such as THF etc.

f. Alkanes, alkenes, toluene, cumene, xylene etc. and combinations thereof.

In general, the water soluble organics constitute a complex mixture of the above and the feed mixture may comprise such water soluble organics in a concentration from about 1% by weight to about 10% by weight such as in the range from about 2% by weight to about 5% by weight.

3. Make up homogeneous catalyst in form a potassium carbonate and/or potassium hydroxide and/or potassium acetate; preferably added in the form of an aqueous solution and added in an amount so that the total concentration of potassium in the resulting feed mixture is at least 0.5% by weight such as a concentration in the feed mixture of at least 1.0% by weight; preferably the concentration of potassium is at least 1.5% by weight such as at least 2.0% by weight;

4. Make up base for pH adjustment. Preferably, sodium hydroxide is added to the feed mixture in an amount so as the pH measured in the recycled water phase is above 7 and preferably in the range 8.0 to 12.0 such as in the range 8.0 to 10.0.

The ingredients 1.-4. are preferably all on a liquid form and may advantageously be premixed and optionally preheated, before being mixed with the organic matter to produce said feed mixture. Premixing and/or preheating may reduce loading time and heating time required in the mixer.

The mixing of the carbonaceous material and other ingredients are mixed so as to form a homogeneous slurry or paste. Said mixer may be a stirred vessel equipped with means for efficiently mixing, dispersing and homogenizing viscous materials such as a planetary mixer, Kneader or Banbury mixer.

The mixer is preferably further equipped with means for preheating said feed mixture to a temperature in the range from about 80° C. to about 250° C., preferably in the range from about 130° C. to about 220° C. and more preferably in the range from about 150° C. to about 200° C. such as in the range from about 160° C. to about 180° C. at a sufficient pressure to avoid boiling such as a pressure in the range 1-30 bars, preferably in the range 4-20 bars such as in the range 5-10 bars.

Heating the feed mixture to temperatures in the above ranges results in a softening and/or at least partly dissolution of the carbonaceous thereby making the feed mixture easier to size reduce and homogenize. Preferred means for heating said feed mixture during the preparation according to the present invention include a heating jacket. In a preferred embodiment the heat for preheating said feed mixture is obtained from the cooling of the converted carbonaceous material comprising liquid hydrocarbon product.

Hereby the energy efficiency of the process may be further enhanced. The mixer may further be equipped with a recirculation loop, where material is withdrawn from said mixer and at least partly re-circulated in an internal or external loop and re-introduced into said mixer so as to control the feed mixture characteristics e.g. rheological properties such as viscosity and/or particle size to a predefined level. The external loop may further comprise one or more size reduction and/or homogenization device(-s) such as a macerator and/or a colloidal mill and/or a cone mill or a combination thereof in a series and/or parallel arrangement.

Preferably, the carbonaceous material is fed to the mixer gradually rather than at once to control the viscosity of the feed mixture and that feed mixture remains pumpable, while being size reduced and homogenized. The control of the viscosity may be performed by measuring the power consumption of the mixer and/or colloidal mill and adding organic matter to the feed mixture according to a predefined power consumption. It is further advantageous not to empty the mixer completely between batches as the prepared feed mixture acts as a texturing agent for the next batch and thereby assists in homogenizing the next batch by making it more pumpable, and thereby the carbonaceous material may be added faster.

Other preferred means for thoroughly mixing and homogenizing the ingredients in the feed mixture include inline mixers. Such inline mixers may further introduce a cutting and/or a scissoring and/or a self-cleaning action. A preferred embodiment on such inline device includes one or more extruders.

The feed mixture from the feed mixture mixing step may be fed to a holding tank before entering the pressurization step of the process. Said mixing tank may be equipped with means for agitating said feed mixture in the holding tank and/or circulation means for circulating said feed mixture around said holding tank whereby the feed mixture is maintained in a shear thinned and easier to pump state. Optionally the feed mixture may be expanded before entering the holding tank, whereby the feed mixture may be further size reduced and homogenized.

Typically, the dry content of carbonaceous material in the feed mixture according to the present invention is in the range 10 to 40% by weight, preferably in the range 15 to 35% by weight and more preferably in the range 20 to 35% by weight.

The process according to the present invention requires water to be present in said feed mixture. Typically, the water content in said feed mixture is at least 30% by weight and in the range 30 to 80% by weight and preferably in the range 40 to 60% by weight.

2. Conversion

The second step, conversion, comprises a pressurization step (2a) where the feed mixture is pressurized by pumping means to a pressure of at least 150 bar and up to about 450 bar such as a pressure of least 180 bar and up to 400 bar; preferably the feed mixture is pressurized by pumping means to a pressure above the critical point of water such as a pressure of least 250 bar; more preferably the feed mixture is pressurized by pumping means to a pressure of at least 300 bar such as at least 320 bar. A particularly preferred embodiment according to the present is a feed mixture pressure after the pumping means of 320 to 380 bars. According to the present invention said pressurization to the desired reaction pressure is essentially performed before heating from entry temperature from the feed mixture preparation step to the reaction temperature.

Many embodiments according to the present invention relates to processing of feed mixtures with a high content of carbonaceous material as described above. Such feed mixtures typically have densities in the range 1050 to 1200 kg/m3, and typically behaves as a homogeneous pseudoplastic paste rather than a suspension of discrete particles (liquid). The viscosity of such pastes may vary widely with shear rate due to the pseudoplastic (shear thinning) behavior and may be in the $10^3$ to $10^7$ cP depending of the specific shear rate and carbonaceous material being treated.

An aspect of the present invention relates to a pressurization system for pressurizing such highly viscous pseudoplastic feed mixtures. According to a preferred embodiment of the present invention, the pressurization system comprises two or more pressure amplifiers each comprising cylinders with a piston equipped with driving means for applying and/or receiving a force to the piston. Advantageous driving means for the pistons in the cylinders according to the present invention include hydraulically driven means.

The pressurization system according to the present invention is typically designed for low stroke speeds (large stroke volume) thereby allowing for the use of actuated valves for filling and emptying of the cylinders rather than check valves. Preferred actuated valves according to the present invention include gate valves and ball valves or a combination thereof.

The stroke speed of the pistons according to an embodiment of the present invention may be from about 1 stroke per minute up to about 150 strokes per minute such as from about 5 strokes per minute up to about 100 strokes per minute. Preferably the stroke speed of the pistons are from about 10 to about 80 strokes per minute such as a stroke speed of the piston in the range 20 strokes per minute to about 60 strokes per minute. Besides allowing for the use of actuated valves the low stroke speed of the piston reduces the wear on pistons, seals and valve seats.

The inlet temperature to the pressurization is generally in the range from about 10° C. to about 250° C. such as from about 20° C. to about 220° C.; preferably the inlet temperature to the pressure amplifying cylinders is in the range from about 50° C. to about 210° C. such as from about 80° C. to about 200° C.; even more preferably the inlet temperature to the pressure amplifying cylinders is in the range from about 100° C. to about 180° C. such as from about 120° C. to about 170° C.

For applications according to the present invention, where the temperature exceeds about 120° C. such as about 140° C., the cylinders may further be equipped with means for cooling the seals of piston in order to withstand the operating conditions.

In an advantageous embodiment, pressure energy is recovered in the pressure reduction step described below under step 6. Pressure reduction, and transferred to an energy absorption reservoir, where the energy absorbed by the pressure reducing device is transferred to the reservoir for successive utilization in e.g. the pressurization step. Thereby a very energy efficient high pressure process is obtained.

The pressurized feed mixture is subsequently heated (2b) to a reaction temperature in the range from about 300° C. and up to about 450° C., such as a temperature in the range from about 330° C. to about 430° C.; preferably the pressurized feed mixture is subsequently heated to a reaction temperature in the range from about 350° C. and up to about 425° C., such a temperature in the range from about 390° C. to about 420° C. such as in the range 400° C. to 415° C.

According to an aspect of the present invention, the heating of the feed mixture is performed by indirect heat exchange with high pressure water as the heat transfer medium between the cooling and heating step. By use of such heat transfer medium it is obtained that both the feed mixture and the product mixture may flow inside tubes thereby allowing for easier cleaning.

By said heat recovery it is obtained that the process becomes very energy efficient as most of the heat required is recovered. In many embodiments of the present invention at least 40% of the energy required to heat the feed mixture to the desired reaction temperature is being recovered such as at least 50% of the energy required to heat the feed mixture to the desired reaction temperature is being recovered. Preferably, at least 60% required to heat the feed mixture to the desired reaction temperature is recovered such as at least 70% of the energy required being recovered.

Subsequent to heating to reaction temperature said pressurized and heated feed mixture is maintained at the desired pressure and temperature in a reaction zone (2c) for a predefined time for conversion of the carbonaceous material (-s). The feed characteristics and/or the combination of pressure and temperature according to the present invention generally allow for shorter reaction times and/or a more reacted liquid hydrocarbon product than in the prior art without sacrificing the yield and/or quality of the desired product. The predefined time in said reaction zone may according to an embodiment of the present invention be in the range 1 to 60 minutes such as 2 to 45 minutes, preferably said predefined time in said reaction zone is in the range 3 to 30 minutes such as in the range 3 to 25 minutes, more preferred in the range 4 to 20 minutes such as 5 to 15 minutes.

3. Cooling & Expanding

The product mixture comprising liquid hydrocarbon product, water with water phase liquid organic compounds and dissolved salts, gas comprising carbon dioxide, hydrogen, and methane as well as suspended particles from said converted carbonaceous material is subsequently cooled (3) to a temperature in the range 70° C. to 250° C. such as in the range 120° C. to 220° C.; preferably to a temperature in the range 130° C. to 200° C. such as in the range 140° C. to 180° C.

A preferred embodiment of a cooling step according to the present invention is where said heat exchange is performed by indirect heat transfer with high pressure water as heat transfer medium as described under conversion. By use of such indirect heat transfer via a heat transfer medium it is obtained that both the feed mixture and the product mixture can flow inside tubes thereby allowing for easier cleaning. The heat transfer medium may optionally be further heated and/or be further cooled so as to allow for added controllability and flexibility of the heating and cooling. Said heat transfer medium may also be used for transfer of heat to/from other unit operations of the process such as e.g. the feed preparation (1) and/or the upgrading part of a process according to the present invention.

The cooled product mixture thereafter enters a pressure reducing device (3), where the pressure is reduced from the conversion pressure to a pressure of less than 200 bars such as a pressure of less than 120 bars. Preferably, the pressure is reduced to less than 90 bars such as less than 80 bars. More preferably, the pressure is reduced to less than 50 bars such as a pressure in the range 10 bars to 40 bars.

Suitable pressure reduction devices include pressure reduction devices comprising a number of tubular members in a series and/or parallel arrangement with a length and internal cross section adapted to reduce the pressure to desired level, and pressure reducing devices comprising pressure reducing pump units.

In a preferred embodiment the cooled product mixture enters a pressure reducing device, where the pressure reduction unit comprises at least one inlet and an outlet, the pressure reduction unit being adapted to receive a pressurized fluid at process pressure level at the inlet, being adapted to isolate the received pressurized fluid from the upstream process and from the outlet and being adapted to reduce the pressure of the fluid to a lower predetermined level and further being adapted to output the fluid through the outlet while still isolated towards the upstream process.

In general, pressure reduction unit comprises an actuated valve at the inlet and an actuated valve at the outlet and between the inlet valve and the outlet valve a pressurization device. Further a pressure reduction unit according to an embodiment of the present invention comprises means for measuring the pressure upstream the inlet valve, between the inlet valve and the outlet valve and downstream the outlet valve.

The pressure reduction unit according to the present invention may further comprise a pump unit having a cylinder and a piston as well as means for driving the piston inside the cylinder. Advantageously the pressure reduction unit further comprises a position indicator indicating the cycle position of the pressure reduction device and being adapted to provide a control signal for opening or closing at least one valve in the pressure reduction system.

An advantageous embodiment of a pressure reduction device according to the present invention is where the pressure reduction pump is connected to a further pump that drives a pressurization of the energy absorption reservoir. For example, the pressure reduction device further comprising an energy reservoir, where the pressurization pump is operatively connected to the reservoir and where the energy absorbed by the pump is converted and transferred to the pressurization pump.

In the energy reservoir drives a pressurization pump adapted to pressurize the feed mixture in the pressurization step (step 2 above) of the high pressure process. In one embodiment of the present invention, this is performed by a low pressure turbine connected to a generator generating electrical energy, and the electricity generated reduces the energy required to drive the pressurization pump in the pressurization step.

The pressure reducing device according to the present invention are typically designed for low stroke speeds (large stroke volume) thereby allowing for the use of actuated valves for filling and emptying of the cylinders rather than check valves. Preferred actuated valves according to the present invention include gate valves and ball valves or a combination thereof.

The stroke speed of the pistons according to an embodiment of the present invention may be from about 1 stroke per minute up to about 150 strokes per minute such as from about 5 strokes per minute up to about 100 strokes per minute. Preferably the stroke speed of the pistons are from about 10 to about 80 strokes per minute such as a stroke speed of the piston in the range 20 strokes per minute to about 60 strokes per minute. Besides allowing for the use of actuated valves, the low stroke speed of the piston reduces the wear on pistons, seals and valve seats.

The inlet temperature to the pressure reduction device is generally in the range from about 10° C. to about 250° C. such as from about 20° C. to about 220° C.; preferably the inlet temperature to the pressure amplifying cylinders is in the range from about 50° C. to about 210° C. such as from about 80° C. to about 200° C.; even more preferably the inlet temperature to the pressure amplifying cylinders is in the range from about 100° C. to about 180° C. such as from about 120° C. to about 170° C.

For applications according to the present invention, where the temperature exceeds about 120° C. such as about 140° C., the cylinders may further be equipped with means for cooling the seals of piston in order to withstand the operating conditions.

4. Separation

The converted feed mixture is further separated (4) into at least a gas phase comprising carbon dioxide, hydrogen, carbon monoxide, methane and other short hydrocarbons (C2-C4), alcohols and ketones, a crude oil phase, a water phase with water phase liquid organic compounds as well as dissolved salts and eventually suspended particles such as inorganics and/or char and/or unconverted carbonaceous material depending on the specific carbonaceous material being processed and the specific processing conditions. Dissolved salts and inorganics may include metal or alkali or alkaline earth metals such as potassium, sodium, chlorides, sulphate, carbonate and bicarbonate, aluminium, calcium, magnesium, sodium, and potassium, silica, iron, cobalt, nickel, phosphorous. The inorganics originate from the carbonaceous feedstock materials such as biomass and/or from homogenous catalyst(-s) applied in the high pressure production process and/or from pollution during the high pressure production process.

For some carbonaceous materials comprising high inorganic contents the partly cooled and partly depressurized product stream may be filtered to remove suspended solids prior to entering the further separation (4).

According to a preferred embodiment the separation is performed by a first separation of the individual phases in a phase separator such as a 3-phase separator and subsequently purifying the separated oil phase such as reducing the concentrations of contaminants such as water and/or inorganics e.g. by adding one or more washing agents and/or viscosity reducing agents and/or density reducing agents and separating the oil phase from the one or more washing agents and/or viscosity reducing agents and/or density reducing agents in a 3-phase separator.

The water phase from the first separator typically contains homogeneous catalyst(-s) such as potassium and sodium as well as water phase liquid organic compounds.

5. Upgrading

The renewable crude oil may further be subjected to upgrading process (5) where it is pressurized to a pressure in the range from about 20 bar to about 200 bars such as a pressure in the range 50 to 120 bar, before being heated to a temperature in the range 300° C. to 400° C. in one or more steps and contacted with hydrogen and heterogeneous catalyst(s) contained in one or more reaction zones, and eventually fractionated into different boiling point fractions.

Figure 2:
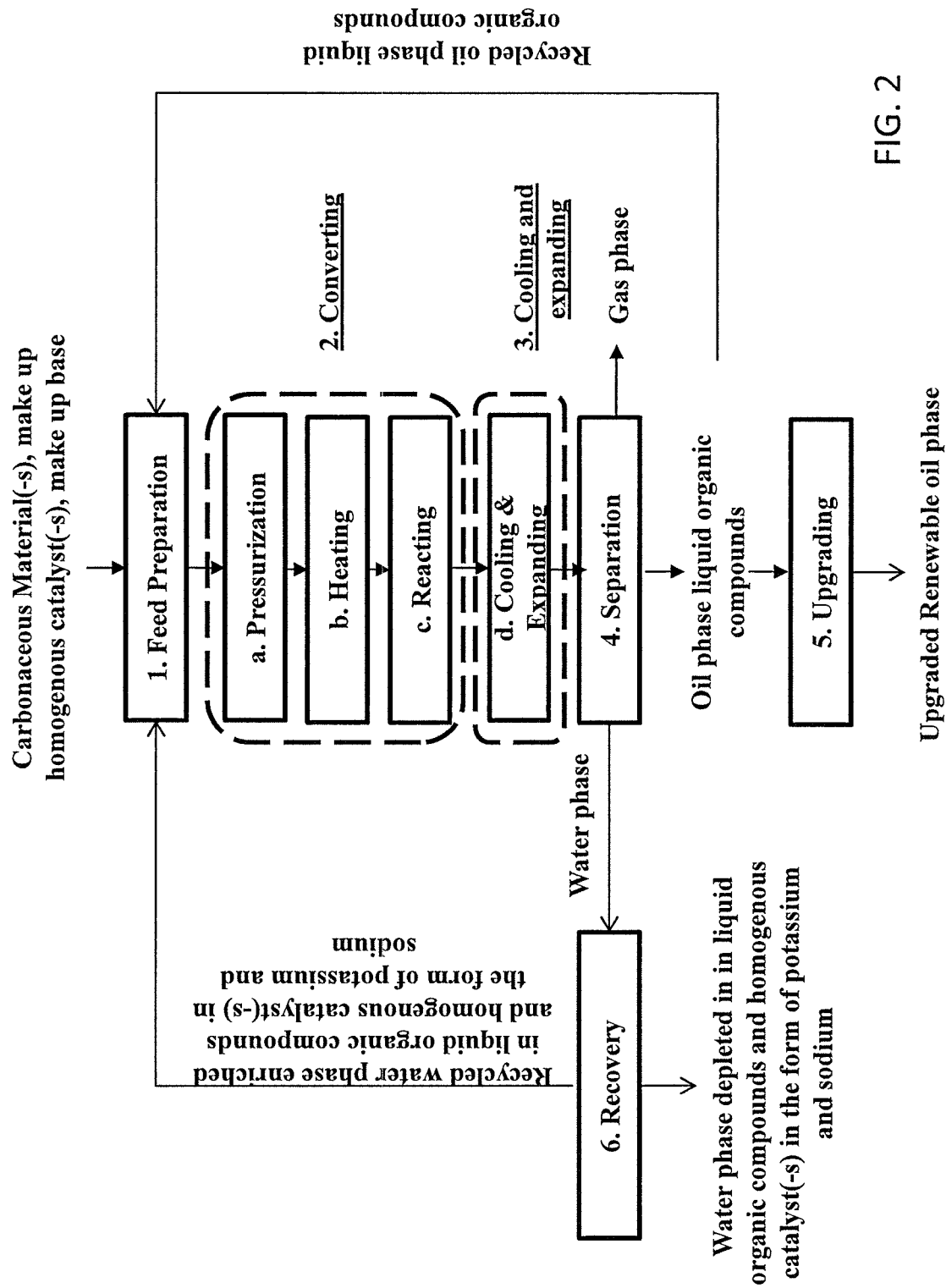
FIG. 2 shows a schematic overview of a first embodiment of a continuous high pressure process for transforming carbonaceous materials into renewable oil phase liquid organic compounds including a system for recovering water phase liquid organic compounds and homogeneous catalysts in the form of potassium and sodium according to the invention.

FIG. 2 shows a schematic overview of an embodiment of a continuous high pressure process for transforming carbonaceous materials into renewable oil phase liquid organic compounds further including a system for recovering water phase liquid organic compounds and homogeneous catalysts in the form of potassium and sodium.

The water phase liquid organic compounds in the water phase often comprise a complex mixture and typically comprises one or more compounds selected from one or more of the groups:
  a. Ketones such as acetone, propanones, butanones, penthanones, penthenones, cyclopentanones such as 2,5 dimethyl cyclopentanone, cyclopentenones, hexanones and cyclohexanones such as 3-methyl hexanone, quionones
  b. Alcohols and poly-alcohols such as methanol, ethanol, propanols, buthanols, penthanols, hexanols, heptanols, octanols such as 2-butyl-1-octanol, hydroquinones, benzene diols
  c. Phenols, alkylated phenols, poly-phenols, monomeric and oligomeric phenols, creosol, thymol, alkoxy phenols, p-coumaryl alcohol, coniferyl alcohol, sinapyl alcohol, flavenols, catechols
  d. Carboxylic acids such as formic acid, acetic acid and phenolic acids like ferric acid, benzoic acids, coumarin acid, cinnamic acid, abietic acid, oleic acid, linoleic acid, palmetic acid, steric acid
  e. Furans such as tetrahydrofuran (THF)
  f. Alkanes, alkenes, benzene, toluene, cumene, xylene The water phase from the separation step (4) is according to a preferred embodiment of the present invention fed to a recovery system for recovery of water phase liquid organic compounds and/or homogeneous catalysts in the form of potassium and sodium salts.

Many preferred embodiments of continuous high pressure processing of carbonaceous material to hydrocarbons according to the present invention include a recovery step for recovering homogeneous catalyst(-s) and/or water phase liquid organic compounds from the water phase from the separation step (4). Thereby a water phase depleted in liquid organic compounds and homogeneous catalysts in the form of potassium and sodium and a water phase enriched in liquid organic compounds and homogeneous catalysts in the form of potassium and sodium are produced. The liquid phase enriched in water phase liquid compounds and homogeneous catalysts in the form of potassium and sodium is in a preferred embodiment at least partly recycled and introduced into the feed preparation step as shown at the figure.

Hereby by the overall oil yield and energy efficiency of the process are increased, and the process economics is significantly improved by said recovery and recirculation of homogeneous catalysts.

A preferred embodiment according to the present invention is where the recovery system comprises one or more techniques selected among evaporation, distillation/fractionation, reverse osmosis, nanofiltration, ultrafiltration, pervaporation, activated carbon, a biological waste water treatment step and combinations thereof.

An advantageous embodiment is where the recovery system (6) comprises an evaporation and/or one or more distillation steps, where the heat for the evaporation and/or distillation is at least partly supplied by transferring heat from the high pressure water cooler via a heat transfer medium such as a hot oil or steam, whereby the overall heat recovery and/or energy efficiency is increased.

Oil phase liquid organic compounds is in a preferred embodiment also recycled and introduced to the feed preparation step as also shown in FIG. 2.

Figure 3:
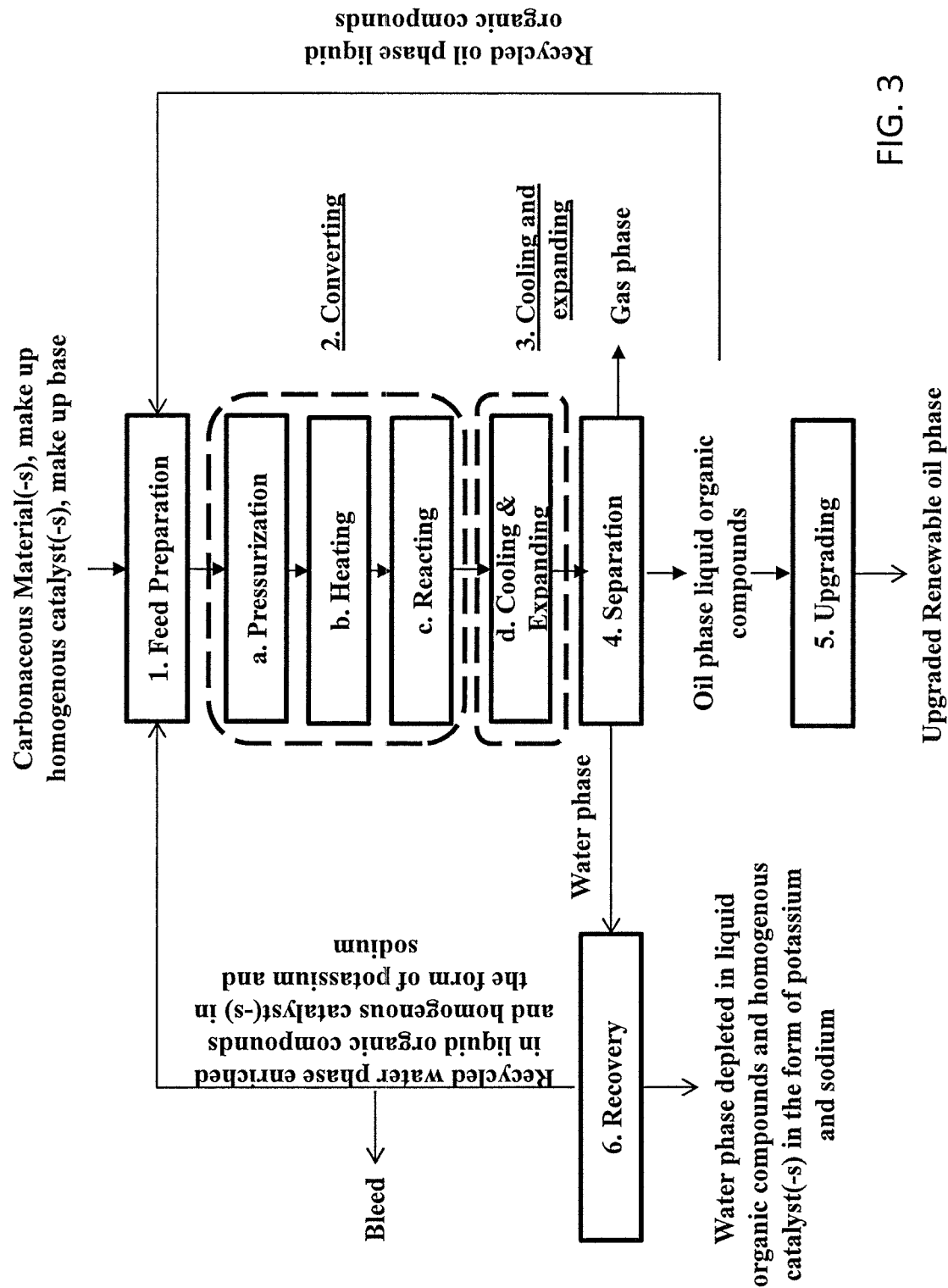
FIG. 3 shows a schematic overview of a further embodiment of a continuous high pressure process for transforming carbonaceous materials into renewable oil phase liquid organic compounds including a system for recovering water phase liquid organic compounds and homogeneous catalysts in the form of potassium and sodium, and further including withdrawing a bleed stream from water phase being enriched in water phase liquid organic compounds according to the invention.

FIG. 3 shows a schematic overview of an advantageous embodiment of a continuous high pressure process for transforming carbonaceous materials into renewable oil phase liquid organic compounds including a system for recovering water phase liquid organic compounds and homogeneous catalysts in the form of potassium and sodium, and further including withdrawing a bleed stream from water phase being enriched in water phase liquid organic compounds and homogeneous catalysts comprising potassium and/or sodium prior to introduction to feed preparation step.

The water phase from the separation system contains water phase liquid organic compounds and dissolved homogenous catalyst and may also be contain suspended particles and other dissolved salts. The water phase may according to a preferred embodiment of the invention, be filtered prior to entering the recovery unit to reduce suspended particles. Hereby fouling of the recovery system may be reduced, and cleaning and service intervals increased thereby increasing the overall availability of process.

Make up base such as sodium hydroxide may be added to the process water prior to entering the recovery system in order to maintain the pH value of process water in the recovery system in the range 7 to 14 such as in the range 8.5 to 14; preferably in the range 9 to 14 such as in the range 10 to 14; even more preferably the pH of the process water entering the recovery system is maintained in the range 10-13 by measuring the pH and adding base to the process water prior to entering the recovery system. Hereby the volatility of water phase liquid organic compounds such as phenols is reduced and thus to a larger extent maintained in the water phase enriched in water phase liquid organic compounds (the concentrate), when evaporation and/or distillation techniques according to the present invention is applied. Hereby further processing of the water phase being depleted is made easier and may in some embodiments of the present invention even be eliminated e.g. the water phase being depleted in water phase liquid organic compounds may be sufficiently purified for direct discharge.

However, whereas trace elements such as most divalent ions such as calcium and metals have limited solubility in the water phase and will be removed as suspended solids in the separation and filtering system(-s), it has been found that dissolved salts such as chloride will accumulate if no bleed is withdrawn. Hence, according to an advantageous embodiment a bleed stream is withdrawn from the water phase being enriched in water phase liquid organic compounds and homogeneous catalysts as shown in FIG. 3.

The minimum size of the bleed stream required is dictated by chloride concentration i.e. the amount of chloride fed in with the carbonaceous material shall equal the amount of chloride withdrawn with the bleed stream.

According to an advantageous embodiment of the present invention, the weight ration of the bleed stream being withdrawn from the water phase stream being enriched in liquid organic compounds and homogeneous catalyst to the total water phase stream fed to said recovery system is in the range 0.01 to 0.5 such as in the range 0.02 to 0.4; preferably the weight ratio of said bleed stream being withdrawn to the total water phase stream enetering the recovery system is in the range 0.03 to 0.25 such as in the range 0.04 to 0.15.

Figure 4:
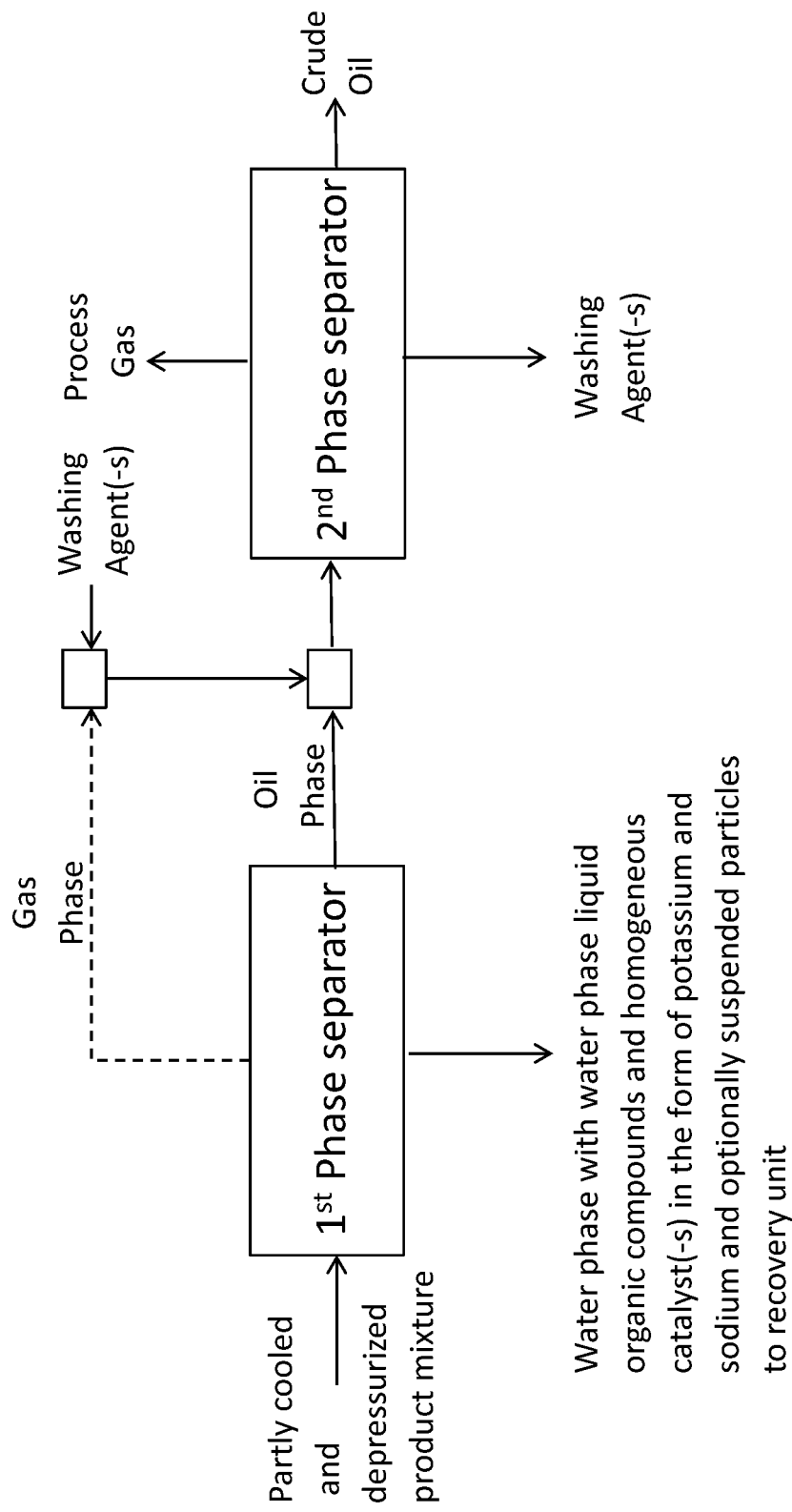
FIG. 4 shows a schematic overview of an embodiment of a separation system according to the invention.

FIG. 4 shows a schematic overview of a first embodiment of a separation system according to the present invention. The product from the conversion is cooled to a temperature in the range 50° C. to 250° C. such as a temperature in the range 60° C. to 220° C., preferably to a temperature in the range 120° C. to 180° C. and most preferably to a temperature in the range 130° C. to 170° C., and depressurized to a pressure in the range 10 bar to 150 bar such as to a pressure in the range 10 bar to 100 bar, preferably the product from the conversion is depressurized to a pressure in the range 10 bar to 74 bar such as to a pressure in the range 15 bar to 50 bar, even more preferably to a pressure in the range 20 to 50 bar.

The partly cooled and partly depressurized product stream from the conversion is fed to a first phase separator, where the product from the conversion is separated under pressure into a gas phase, oil phase, and a water phase and optionally a solid phase depending on the specific carbonaceous material being converted and the specific operating conditions for the conversion process.

Figure 5:
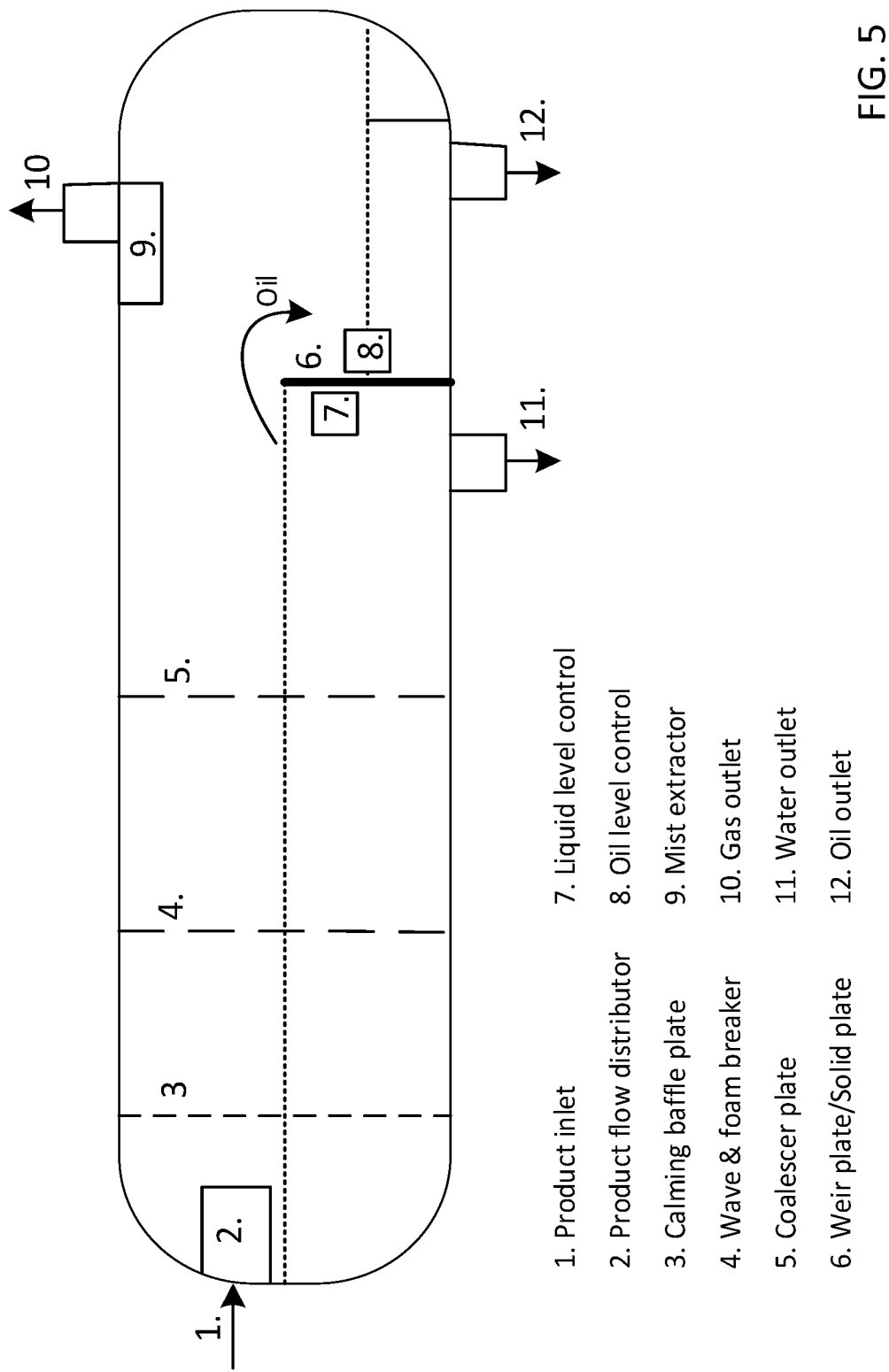
FIG. 5 shows a schematic drawing of preferred embodiment of a 3-phase separator according to the invention.

According to many embodiments of the present invention, the first separator is a gravimetric phase separator as further exemplified in FIG. 5. The phase separator may according to the present invention be horizontally or vertically positioned, however in many preferred applications according to the present invention the first three phase separator is horizontally positioned. By positioning the phase separator horizontally a larger interphase between the gas and liquids are obtained, so that minimal collision of gas bubbles moving upwards and the liquid droplets going downward is obtained. Hereby a more efficient separation is obtained e.g. the separation efficiency may be increased and/or a shorter residence time may be used.

The first phase separator comprises an inlet for introducing said product mixture, and outlets for withdrawing the gas phase, the oil phase (liquid hydrocarbon) the water phase and optionally a solid phase.

The operating temperature of the first phase separator is in a preferred embodiment selected so as to obtain a dynamic viscosity of the liquid hydrocarbon product in the range from about 0.1 to about 30 centipoise during said further separation such as in the range from about 1 to about 20 centipoise during said further separation, preferably the temperature of the separation is selected so as to obtain a dynamic viscosity in the range from about 1 to about 20 centipoise such as in the range 5 to 15 centipoise.

The operating temperature of the first phase separation may according to an embodiment of the present invention be in the range 50° C. to 250° C. such as in the range 80° C. to 200° C., preferably the operating temperature in the first phase separator is the range 120° C. to 180° C. such as a temperature in the range 130° C. to 170° C. By maintaining the operating temperature of the first separation in specified range it is obtained that the dynamic viscosity of the liquid hydrocarbon product (oil phase) is maintained in the above specified range, thereby improving the separation efficiency of water and/or particles contained in the oil phase.

It has further been found that the oil phase may comprise high organic compounds that have a melting point in the range from about 100 to 120° C. Such organic compounds may comprise high molecular weight compounds such as organic resins and/or asphalthene-like compounds that may solidify on inorganic particles in the oil and/or stabilize the water droplets in the oil phase. Such stabilization may be a result of an interfacial film composed of surface active high-molecular-weight polar solids covering small water droplets and this interfacial film provide a barrier for the droplets to coalesce at too low temperature. By maintaining the operating temperature of the separator sufficiently high (e.g. above the melting point of such compounds), the separation efficiency may be improved by the present invention.

The operating pressure of the first phase separator is according to the present invention generally selected above the boiling pressure of the liquid phase so that the liquid phases are substantially maintained in their liquid state at the prevailing separation temperature. Hence, in many embodiments of the present invention the operating pressure of the first phase separator is at least 5 bar such as an operating pressure of at least 10 bar.

However, it has been found that operation at higher pressure improves the separation as will be further illustrated under examples of the separation. Hence, an advantageous embodiment of the present invention is where the operating pressure of said first phase separator be in the range 10 to 150 bar, such as in the range 10 to 100 bars, preferably the pressure in the first separator is in the range 10 to 74 bar, such as in the range 15 to 50 bars, and even more preferably in the 20 to 40 bars.

Many aspects of the present invention relates to the use of one or more phase separators, where the residence time in each of the phase separators is in the range 1-60 minutes such as in the range 1 to 30 minutes, preferably the residence time in each of the separators are in the range 2 to 20 minutes.

According to the present invention the partly dehydrated and partly de-ashed oil phase is withdrawn from the first separator and subjected to a further purification process as shown in the figure.

In an aspect of the present invention part of the oil phase from the first separator is withdrawn prior to the further oil purification and recycled to the feed mixture preparation step of the high pressure process. Hereby the size of the second phase separator is reduced.

According to preferred embodiments of the present invention, the oil purification process comprises mixing the oil phase with one or more washing agents and subsequently feeding the mixed oil phase and washing agent to a second phase separator, where it is separated into a phase comprising at least one washing agent and having an increased content of water and/or inorganics and an oil phase having a reduced inorganic and/or water content, and optionally a gas phase.

The operating pressure of the second separator is according to advantageous embodiments of the present invention in the range 5 to 100 bars, preferably the pressure in the first separator is in the range 10 to 74 bar, such as in the range 15 to 50 bars, and even more preferably in the range 20 to 40 bars.

The operating temperature of the second phase separator may according to an embodiment of the present invention be in the range 50° C. to 250° C. such as in the range 80° C. to 200° C., preferably the second phase separator is operating at a temperature in the range 120° C. to 180° C. such as a temperature in the range 130° C. to 170° C. By maintaining the operating temperature of separation in specified range it is obtained that the dynamic viscosity of the liquid hydrocarbon product (oil phase) is maintained in the above specified range, thereby improving the separation efficiency of water and/or particles contained in the oil phase.

In many aspects of the present invention, the washing agent may comprise a viscosity reducing and/or density reducing agent. The viscosity and/or density reducing agent may be an organic solvent having a boiling point below 150° C. such as below 140° C., preferably below 130° C. such as below 100° C. Suitable viscosity reducing and/or density agents according to the present invention often comprise at least one ketone selected from such as Methyl Ethyl Ketone (MEK, 2-butanone), acetone, propanones, buthanones, pentanones, pentenones, cycclopentanones such as 2,5 dimethyl-cyclo-pentanone, cyclo pentenones, hexanones, cyclohexanones such as 3-methyl hexanones, 2-heptanone and/or a combination thereof. Particularly preferred viscosity reducing agents according to the present invention is methyl ethyl ketones and/or a low boiling fraction of the oil from the converted feed mixture comprising carbonaceous material.

The weight ratio of the viscosity and/or density reducing agent added to the amount of oil are in the range 0.01 to 2 such as in the range 0.2 to 1 such as in the range 0.2 to 0.5.

The viscosity reducing agent reduces the viscosity of the oil phase and may also reduce the density of the oil phase. Further, the viscosity reducing agent may improve dissolution of organic particles and/or improve the hydrophobicity of the oil phase. Hereby the separation efficiency is improved and/or the required separation time may be reduced.

An aspect of the present invention the one or more washing agents may comprise one or more emulsion breaker (-s) selected from xylenes, phenol-formaldehyde resin, n-propanol, heavy and light aromatic naphtha, ethyl benzene, 1,2,4 trimethylbenzene, 1,3,5 trimethylbenzene, 1,2,3 trimethylbenzene, glutaraldehyde, water, toluene, 2-butanone, ethyl acetate, 1-propyl acetate or a combination of them.

The emulsion breaker and/or a mixture of them required a concentration in the range of 10 to 50000 ppm by weight, such as in the range of 100 to 20000 ppm by weight, preferably in the range of 800 to 15000 pp such as in the range of 1000 to 10000 ppm.

In many embodiments of the present invention at least one of the washing agents comprises water. Further an advantageous embodiment according to the present invention is where at least one acidifying agent is added to the at least one washing agent comprising water. Suitable acidifying agents according to the present invention include acetic acid and/or citric acid. Typically said acidifying agent is added in an amount so that the pH of the separated pressurised washing agent from the second separator is in the range from about 2 to about 7 such as a pH in the range from about 2.5 to about 6.5; preferably the pH of the separated washing agent is in the range from about 3 to about 6 such as a pH in the range from about 3 to about 5. By reducing the pH to the specified ranges according to the present invention it is obtained that compounds such as potassium and sodium that may be bound to acidic groups of the oil as soaps are dissolved. Further, the solubility of metals are also increased by reducing the pH. Further, at too low pH it has been found that stable emulsions may be formed.

A particularly preferred embodiment of the present invention is where the acidifying agent comprises pressurized gas produced by the conversion process of the carbonaceous material. The process gas typically comprises carbon dioxide as well as some light hydrocarbon gasses such as methane, ethane, ethene, propane, propene, butane, butene, pentane as further exemplified in example 1. Typically said process gas is withdrawn from the first separator as shown in the figure and mixed with the washing agent(s) in an inline mixer such as a static mixer prior to being introduced into the second phase separator. At the operating pressures of the second phase separator according to the present invention, $CO_2$ dissolves into the water phase and forms carbonic acid whereby the water is acidified to a pH in the range 2.5 to 4. Further at operating conditions the light hydrocarbon gases mentioned above may be dissolved in the oil phase whereby a reduced oil viscosity and/or reduced density of the oil phase and/or improved hydrophobicity of the oil phase is obtained. Hereby the separation efficiency is improved as further exemplified in examples. A further advantage of using the process gas as acidifying agent is that it is easily separated from the oil product and/or washing agent upon reduction of pressure to ambient, which makes the further processing of these streams easier.

FIG. 5 shows a schematic drawing of a preferred embodiment of a 3-phase separator according to the invention. The product mixture preferably enters the phase separator though a product inlet (1) positioned in the free board above liquid level at one end of the separator. The product mixture inlet is preferably equipped with a diverter or distributor (2) such as a diffuser to reduce fluid momentum and separate gas from the liquids, whereby a more efficient gas-liquid separation is obtained. In other aspects of the present invention the product inlet may comprise or further comprise cyclones or cyclone clusters (2).

In an alternative preferred embodiment the separator may comprise a flash separator/degasser, where the gas is separator from the product mixture and the liquid product mixture is introduced to the separator via a dip leg into the level of the water phase (not shown on the figure).

In many preferred embodiments the 3-phase separator is further equipped with flow distribution, wave and foam breaking means such as perforated baffles (3), lamella plates (4) or a mesh to calm the flow as shown on the figure. A 3-phase separator according to the present invention may in further aspects further comprise coalescing means (5) such as a mesh, lamella plates and/or electro-coalescing means to speed up the coalescing process, whereby a more efficient separation of the phase is obtained.

A 3-phase separator according to embodiments of the present invention typically further comprises one or more weir plate (-s) (6) to separate the liquid phases. Often an overflow of the oil phase is present as indicated on the figure.

The gas is typically withdrawn from an outlet (10) in the opposite end of the inlet and often passes a demister or mist extractor (9) to remove droplets before being withdrawn from the separator as shown in the figure. Preferred demisting means (9) according to the present invention includes mesh's, serpentine vanes and cyclones.

A phase separator according to the present invention is typically further equipped with means to measure and control the level of water phase (7) and the level of the oil phase (8).

The water phase is withdrawn via the water outlet (11) and the oil phase is withdrawn through the oil product outlet (12). Both outlets are typically equipped with vortex breakers to keep vortexes from developing when valves are opened. A vortex could potentially suck some gas from the vapour space and re-entrain in the liquid outlet.

Figure 6:
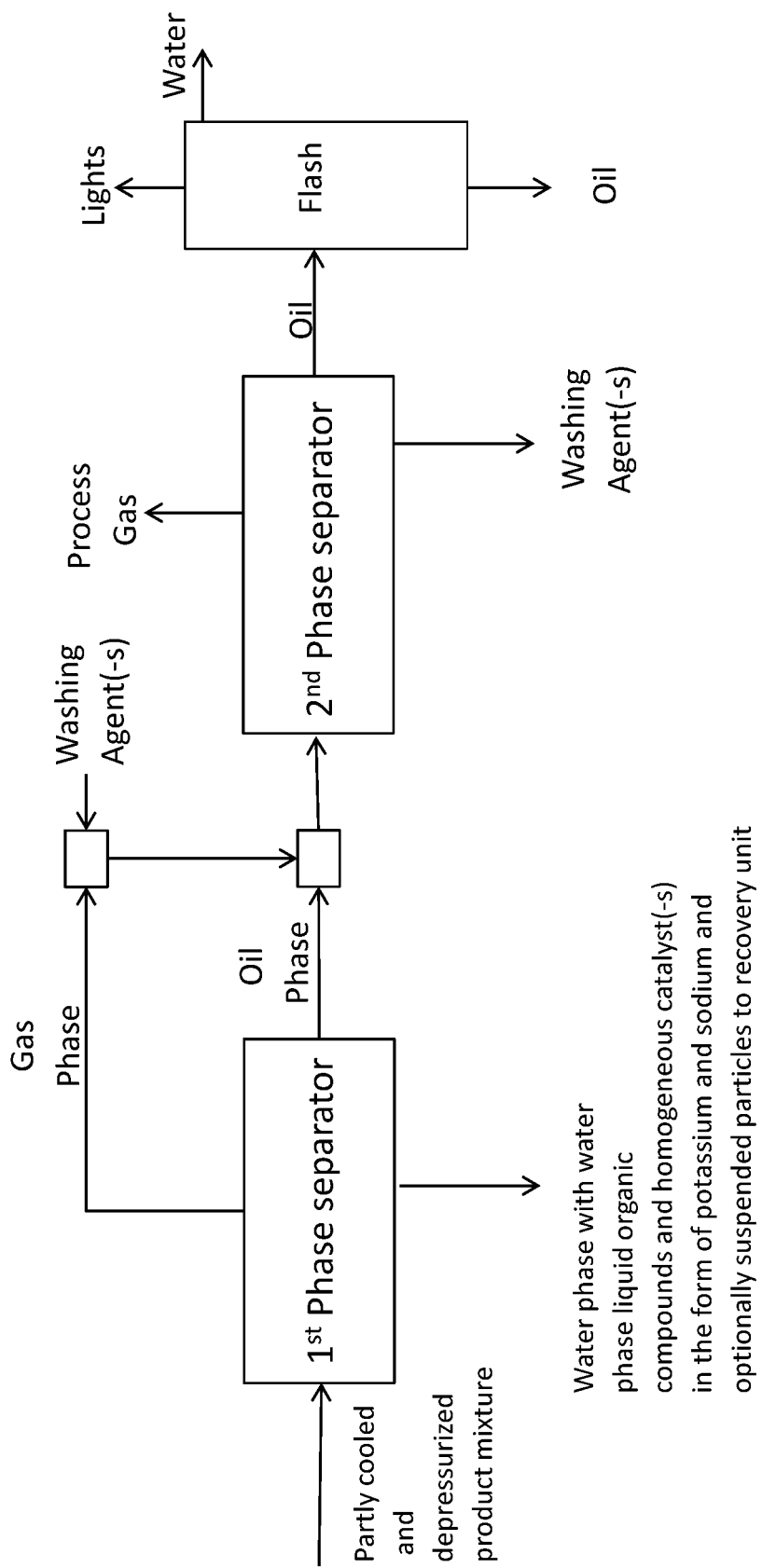
FIG. 6 shows a schematic overview of another embodiment of a separation system according to the invention, further comprising a flash separator for recovering low boiling compounds and water from the oil phase after the second phase separator.

FIG. 6 shows a schematic overview of another embodiment of a separation system according to the invention, further comprising a flash separator for recovering low boiling compounds and water from the oil phase after the second phase separator; Typically the flash separator is operated at a temperature in the range 80° C. to 150° C. such as in the range 100° C. to 130° C. The pressure of the oil product is typically reduced to close to ambient prior to entering said flash separator whereby the oil product is split into 1. a gas phase comprising process gas, low boiling compounds of the oil ("lights"), water and eventually viscosity reducing and/or density reducing agents, 2. An oil phase comprising the dehydrated and de-ashed oil product. The gas from the flash separator is cooled to condense the condensable part of the gas phase such as water, low boiling fraction of the oil and/or viscosity reducing and/or density agents and further separated from the non-condensable part of the gas. The condensable part of the gas may be further separated into a water phase and an organic/light phase by gravimetric phase separation. Both the water phase and the organic phase may according to the resent invention be recycled as washing agents as further illustrated in FIG. 8. Further part of the organic (light) phase may according to an embodiment of the present invention be remixed with the oil product as further described under FIG. 8. Hence, by the flash separation according to the present invention it is obtained that washing agents can be recovered and/or water content in the oil can be further reduced, whereby a more economical and effective separation system is obtained.

Figure 7:
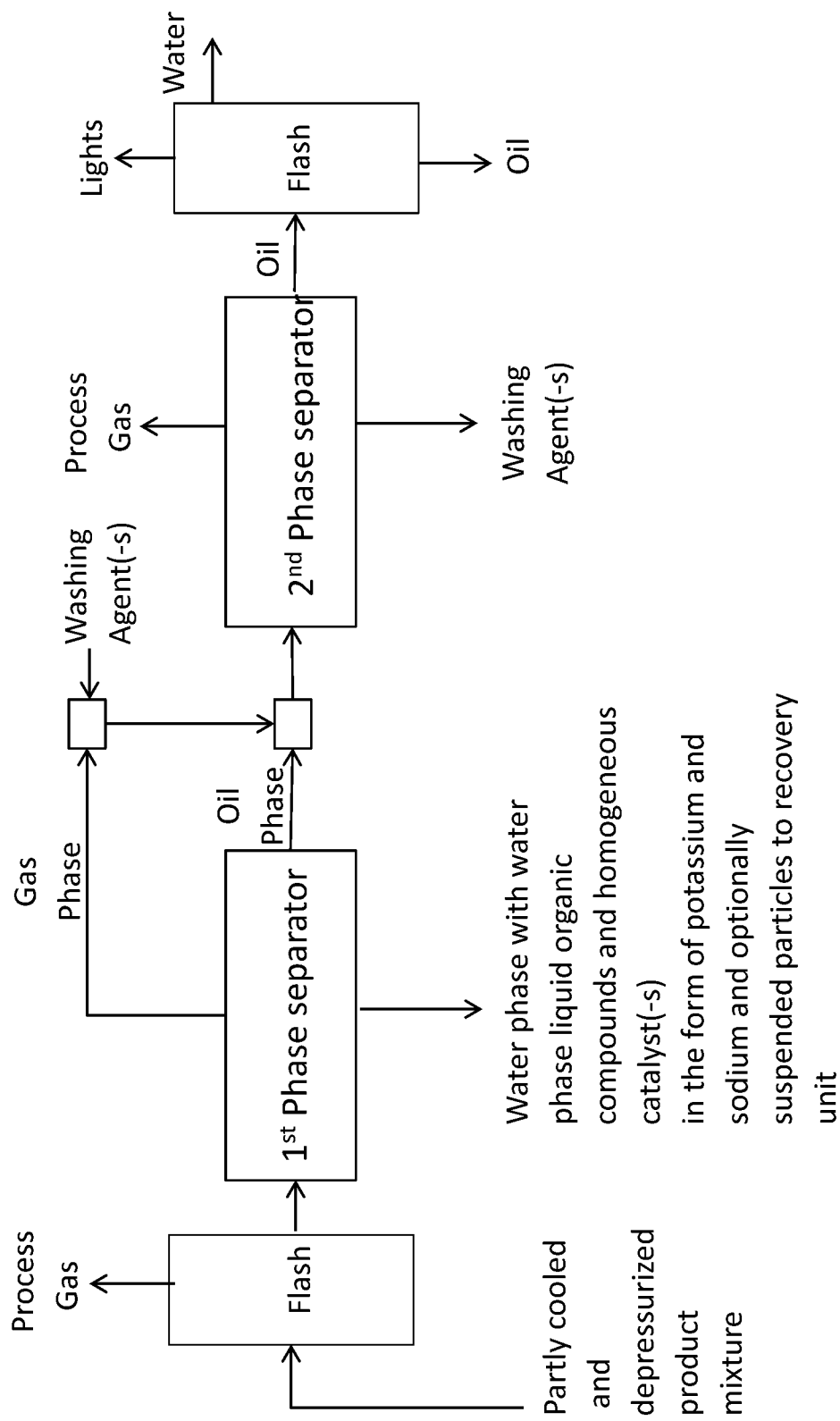
FIG. 7 shows a schematic overview of a preferred embodiment of a separation system according to the invention further comprising a flash separator to separate gas from the converted feed mixture prior to entering the first phase separator.

FIG. 7 shows a schematic overview of a preferred embodiment of a separation system according to the invention further comprising a flash separator or degasser to separate gas from the converted feed mixture prior to entering the first phase separator. The flash separator or degasser according to the present invention may operate at a higher pressure than the subsequent phase separators such as a pressure in the range 50 to 150 bars, whereby at least part of the process gas may be recovered at a higher pressure than in the down-stream phase separators thereby allowing for easier recovery of carbon dioxide and/or hydrogen from said gas stream. Further by operating said flash separator/degasser at a higher pressure than the down-stream phase separators, the cost of the phase separators may be reduced.

Figure 8:
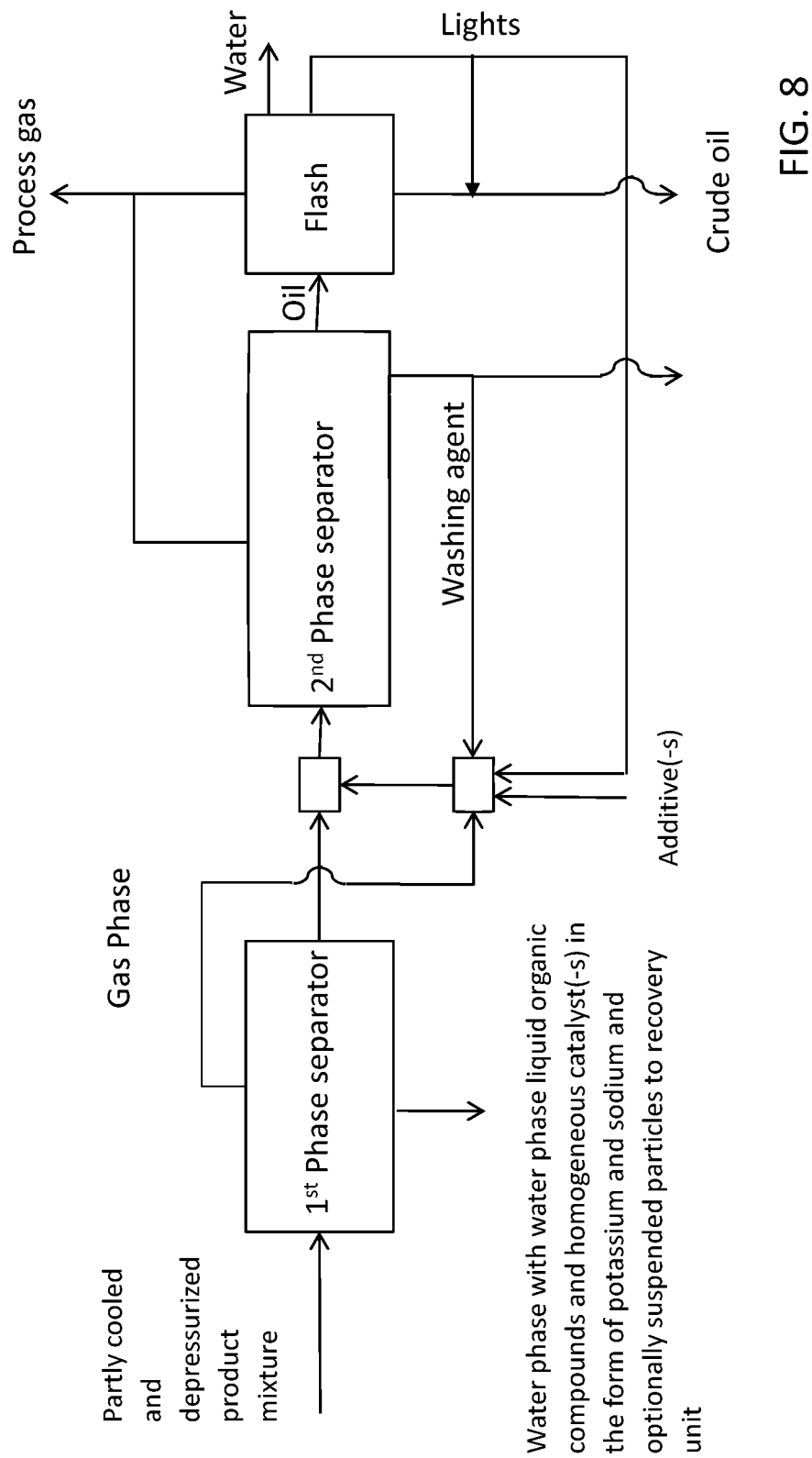
FIG. 8 shows a schematic overview of an advantageous embodiment of a separation system according to the invention further comprising recycling of recovered lights from the flash separation and recycling of washing agent to the washing step.

FIG. 8 shows a schematic overview of an advantageous embodiment of a separation system according to the invention. The separation system comprises a first phase separator for separation of the product stream into a gas phase, an oil phase and a water phase containing dissolved salts and water phase liquid organic compounds The oil phase from the first separator is further purified by mixing it with one or more washing agents prior to entering a second phase separator. As shown in the figure an advantageous embodiment of the present invention may further comprise at least partly recycling and mixing the separated washing agent from the second phase separator and/or recovered "lights" from the flash separator with the oil. The lights may constitute one or more viscosity reducing and/or density reducing agents as described above. Further additives such as make up washing agent(s) and/or de-emulsifiers may be added and mixed with the oil phase as indicated on the drawing.

Figure 9:
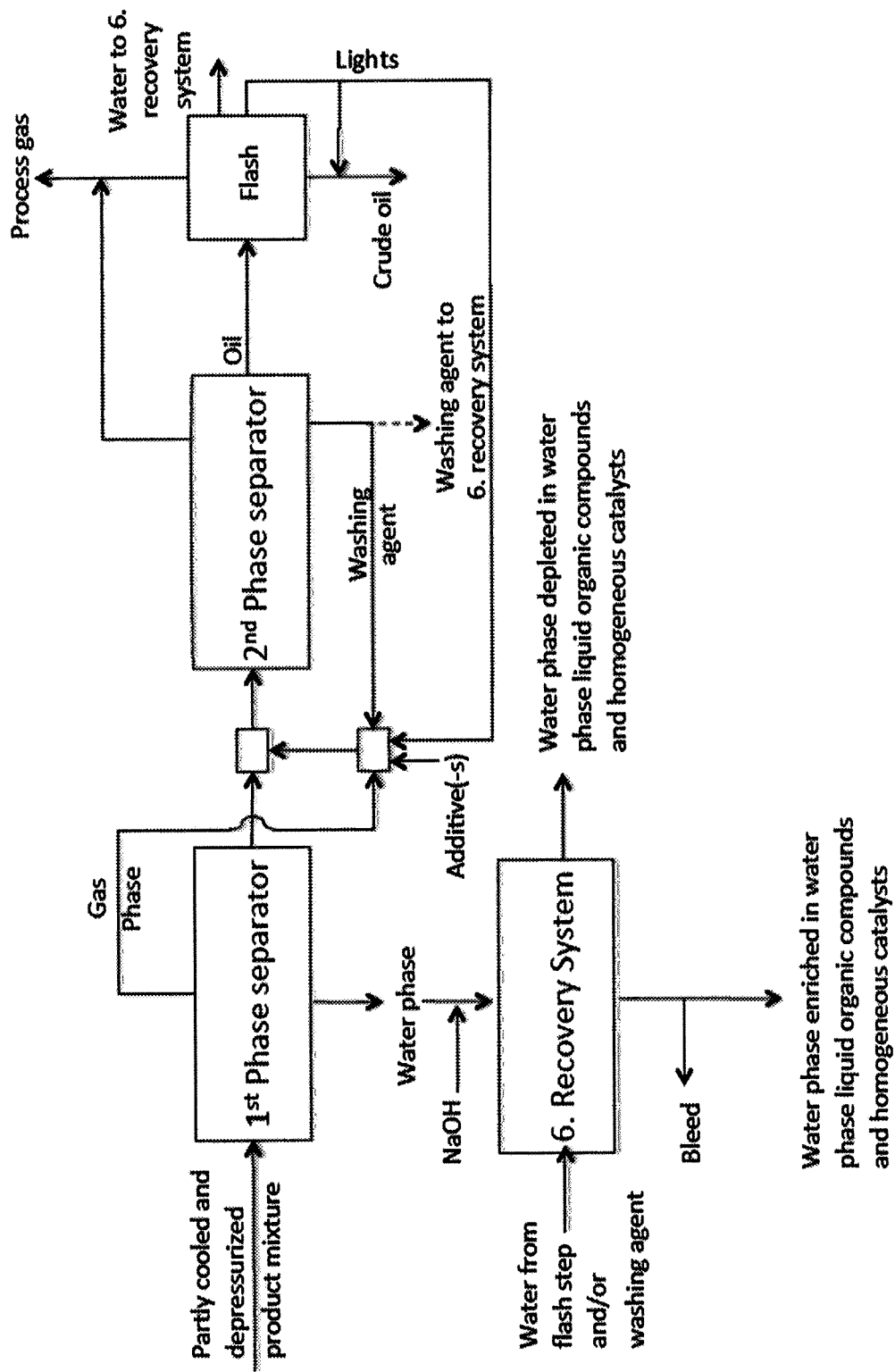
FIG. 9 shows a schematic overview of an advantageous embodiment of a high pressure process adapted for processing a feed stream comprising carbonaceous material comprising an advantageous separation system including a recovery system for recovering water phase liquid organic and homogeneous catalysts in the form of potassium and sodium.

FIG. 9 shows a schematic overview of an advantageous embodiment of a high pressure process adapted for processing a feed stream comprising carbonaceous material comprising an advantageous separation system including a recovery system for recovering water phase liquid organic and homogeneous catalysts in the form of potassium and sodium. The water phase from the first separator and optionally water separated in the flash step and/or aqueous washing agent(-s) are fed to a recovery step (5), wherein the process water is separated into a water stream depleted in water phase liquid organic compounds and homogeneous catalyst (-s) in the form of potassium and sodium, and a water stream enriched in water phase liquid organic compounds and homogeneous catalysts in the form of potassium and sodium. The water stream from the separation may be subjected to a filtering step prior o entering the recovery system (6). Further the pH of the water stream from the separation is preferably maintained in the range 8-14 such as in the range 9-14, preferably in the range 10-14 such as in the range 10-13, and this may according to the present invention be performed by adding sodium hydroxide to the water stream from the separation prior to entering the recovery unit as shown in the figure. A bleed stream is further withdrawn from the water stream enriched in water phase organic compounds and homogeneous catalysts in the form of potassium and sodium as shown in the figure. The remaining water phase enriched in water phase liquid organic compounds and homogeneous catalysts is according to the invention recycled to the feed preparation step. The recovery unit (6) may according to the present invention comprises one or more techniques selected from the group of evaporation, distillation reverse osmosis, nanofiltration, ultrafiltration, pervaporation and fixed beds of activated carbon.

Figure 10:
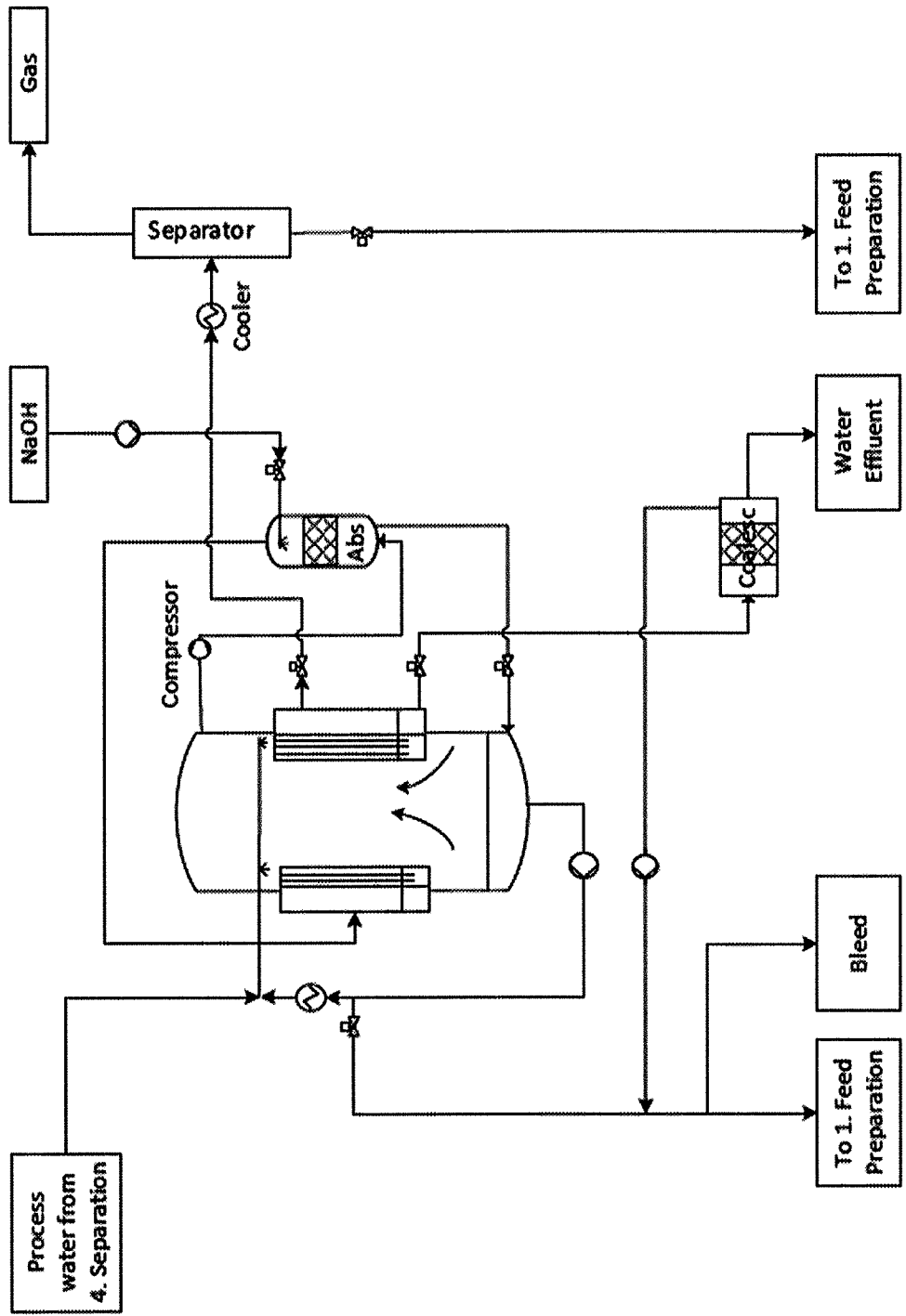
FIG. 10 shows a schematic overview of a preferred embodiment of a recovery system according to the present invention comprising an evaporation technique.

FIG. 10 shows a schematic overview of a preferred embodiment of a recovery system according to the present invention comprising an evaporation technique. Process water from the separation is fed to an evaporator such as a falling film evaporator, where a fraction corresponding to the amount of water entering the high pressure system with the feedstock and additives is evaporated. Typically the ratio of concentrate to the combined water phases entering the recovery unit is in the range from about 0.1 to about 0.9 such as in the range 0.2 to 0.8. Often the ratio of concentrate to the combined water phases entering the recovery unit is in the range from about 0.25 to about 0.7 such as in the range 0.3 to 0.6. In other embodiments of the present invention the ratio of concentrate to the combined water phases (process water stream) entering the recovery unit is typically in the range from about 0.25 to about 0.6 such as in the range 0.3 to 0.6. The process water stream from the separation may be expanded in one or more a flash step prior to entering the evaporation step. The process water (combined water phase) may according to an aspect of the present invention further be filtered (not shown on the figure) prior to entering the evaporator to remove eventually suspended solids to reduce fouling of the evaporator, and to increase cleaning intervals. The filtering may preferably be designed to remove solids larger than 500 micron such as a filtering device designed to remove particles larger than 250 micron; preferably the filtering device is designed to remove particles larger than 100 micron such as particles larger than 50 micron. Further the pH of the combined water phase entering the recovery is according to the present invention preferably maintained at alkaline conditions such as in the range 7 to 14 such as a pH in the range 8 to 14, preferably the pH of the water phase to the recovery unit is maintained in the range 9 to 14 such as in the range 10 to 13. In an aspect of the present invention said maintaining the pH in the specified range is performed by measuring the pH and adding sodium hydroxide to the combined water phase entering the recovery unit. Operating the pH in the specified range in the recovery unit has the advantage of reducing the amount of phenolics in the distillate. The evaporated fraction ("the distillate") may pass a mist eliminator/foam breaker positioned in the top of the evaporator, and in many applications of the present invention the pressure of the evaporated fraction is slightly increased e.g. by mechanical vapour recompression (as shown on the figure) or thermal vapour recompression by steam injection in an ejector. The compression ratio may according to many embodiments of the present invention be up to 2 such as a compression ratio of up to 1.6 bar; preferably the compression ratio of the compressor is up to 1.3 such as up to 1.2. By increasing the pressure of the evaporated fraction the condensation temperature of the vapour increases so that it is possible to use the same vapour for to supply the heat required in the evaporation process thereby making the evaporation process very energy efficient. Optionally, the recompressed vapour may be contacted with a base such as sodium hydroxide in an absorber before to returning to the evaporator on the other side of the evaporation surface. Hereby the total organic carbon content of the distillate such as phenolics is reduced. The alkaline absorbent solution from the absorber is preferably introduced into the concentrate in the evaporator, and may at least partly replace the base used to maintain the pH in the evaporator. The condensed distillate may optionally further pass a coalescing step for further reduction of nonpolar compounds before being discharged. In some applications of the present invention the condensed distillate may be further cooled and may pass a further polishing step such as an activated carbon filter or membrane filtration such as a reverse osmosis step or a bioreactor such as an aerobic waste water treatment step prior to discharge. Hereby a water phase depleted in water phase liquid organic compounds and homogeneous catalyst in the form of potassium and sodium is produced. As illustrated in the figure non-condensed vapours may be withdrawn from condensation side of the evaporator. The non-condensed vapours may in many applications of the present invention comprise compounds having a condensation point lower than water such as methanol, ethanol and acetone as well as non-condensable gas. According to a preferred embodiment of the invention the non-condensed vapors may pass a further condenser operating at a lower temperature than condensation temperature in the evaporator where a further condensation of light compounds and water occurs as shown in the figure. The gas is separated from the further condensed compounds in a separator and vented off. The further condensed compounds are preferably recycled to the feed preparation step(1), preferably by mixing it with the concentrate exiting the evaporator as shown in FIG. 10. The concentrate are preferably continuously withdrawn from the evaporator, and divided into a concentrate stream exiting the evaporator and a recycle concentrate stream to the evaporator. A bleed stream is according to the present invention withdrawn from concentrate stream as shown in the figure, and the remaining concentrate stream being enriched in water phase liquid organic compounds and homogeneous catalyst(-s) in the form of potassium and/or sodium is recycled to the feed preparation step (1). The bleed stream may be further treated such as exemplified in FIGS. 13 and 14 or it may combusted or co-combusted.

Figure 11:
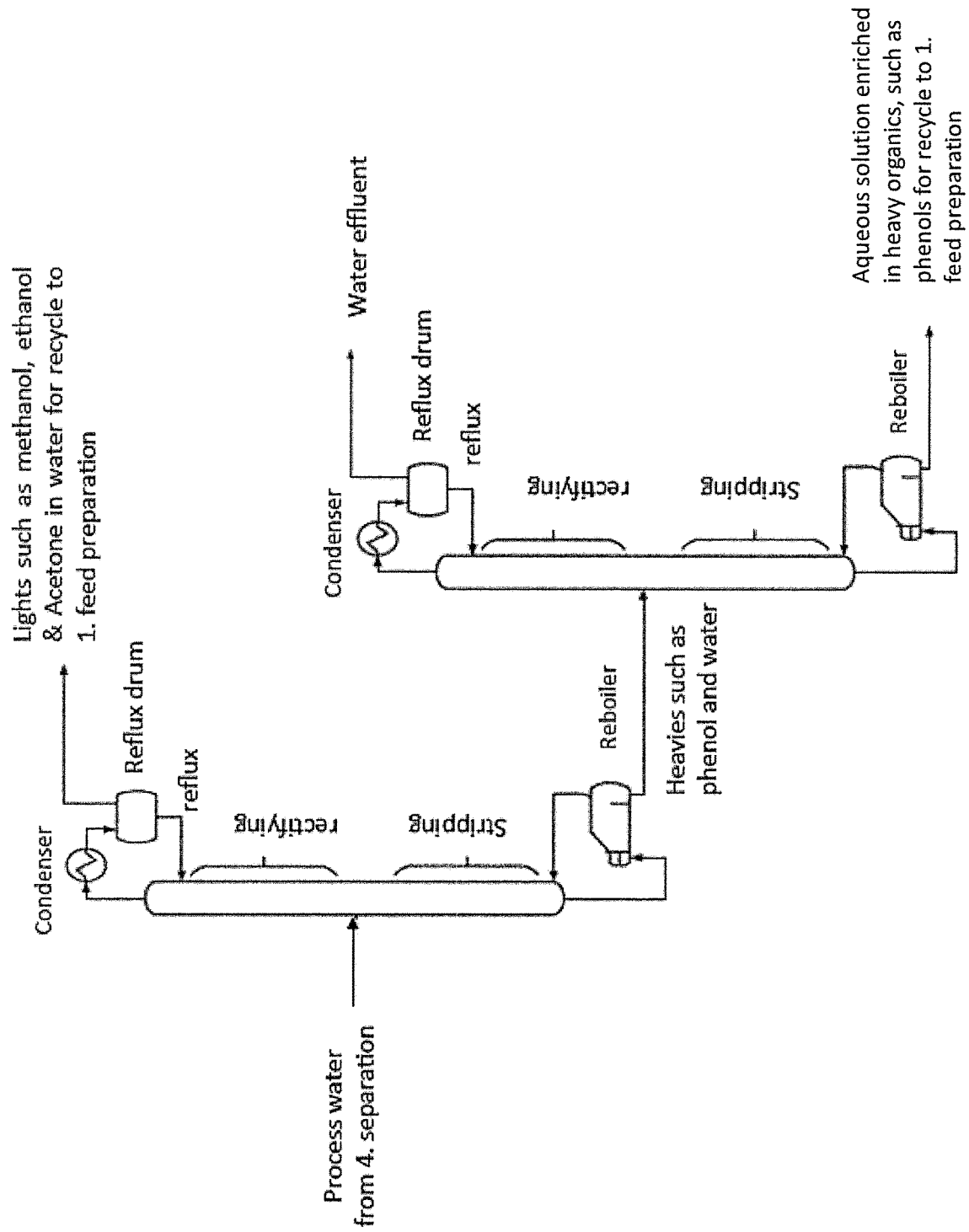
FIG. 11 shows a schematic overview of another embodiment recovery system comprising two distillation columns for separating the process water stream.

FIG. 11 shows a schematic overview of another embodiment recovery system comprising two distillation columns for separating the process water stream into a first stream enriched water phase liquid organic compounds having a boiling point lower than water such as methanol, ethanol and acetone and water, a second stream comprising purified water for discharge and a third stream comprising a concentrate of water phase organic compounds having a boiling point higher than water such as phenolic compounds, water and homogeneous catalyst in the form of potassium and sodium. A base such as sodium hydroxide may be added to the process water prior to entering the first distillation column so as to maintain the pH of the process water in a predefined range so as to control the volatility of phenolic compounds during the distillation.

Figure 12:
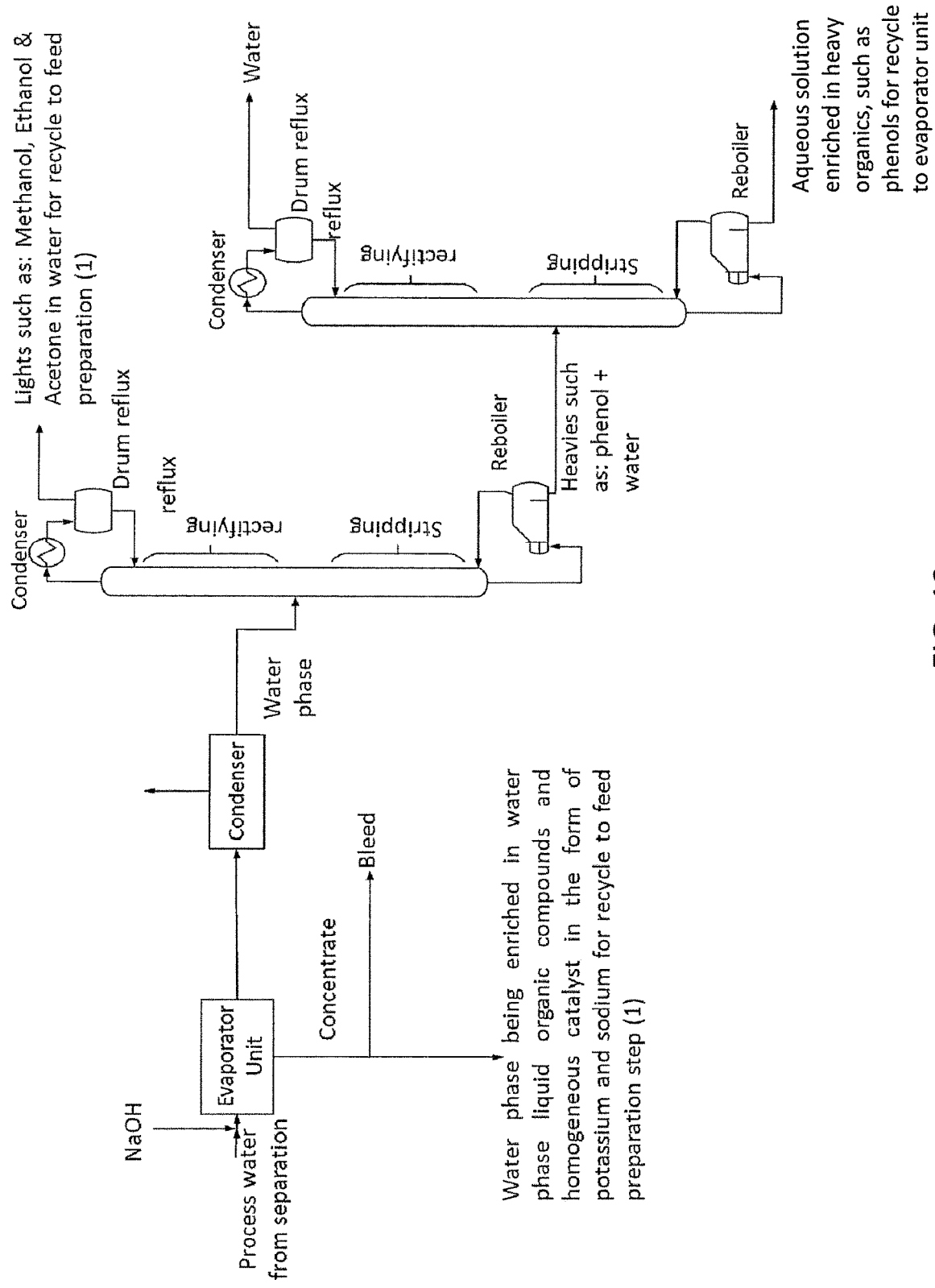
FIG. 12 shows a schematic of a preferred embodiment of a recovery unit comprising an evaporator and two distillation columns.

FIG. 12 shows a schematic of a preferred embodiment of a recovery unit comprising an evaporator and two distillation columns. A base such as sodium hydroxide may be added to the process water prior to entering the evaporator so as to maintain the pH of the process water in a predefined range so as to control the volatility of phenolic compounds in the evaporator. Alternatively, the pH in the evaporator may be at least partly controlled by contacting the evaporated fraction with a base such as sodium hydroxide in an absorber prior to condensation and mixing said alkaline absorbent from the absorber with the process water prior to entering the evaporator and/or in the evaporator. A water stream (concentrate) being enriched in water phase liquid organic compounds and homogeneous catalyst in the form of potassium and sodium is withdrawn from the evaporator and recycled to the feed preparation step after withdrawing a bleed stream to prevent undesired accumulation of chlorides and other compounds due to said recirculation. The evaporated fraction from the evaporator is preferably condensed prior to entering the first distillation column in order to control the gas flow the first distillation column. The evaporated fraction from the evaporator contains compounds lighter than water such as methanol, ethanol and acetone, water as well as small concentrations of heavier compounds having a boiling point temperature higher than water. In the first column, the light fraction is concentrated and leaves the column in the top with some water. The light fraction may according to present invention be recycled to the feed preparation step, optionally by mixing it with the concentrate from the evaporation after withdrawing the bleed stream. The bottom product the first distillation column is overall depleted in water phase liquid organic compounds and homogeneous catalysts but is enriched in heavy compounds having a boiling point temperature higher than water compared to the evaporated fraction from the evaporator and often requires further treatment to meet environmental requirements for discharge. Hence, the bottom fraction from the first distillation column is typically subjected to a further treatment. This treatment may be may according to an advantageous embodiment of the present invention be performed by feeding it to a second distillation column for separation into a purified water product and an aqueous solution being enriched in heavy organics with a boiling point temperature higher than water as shown in the figure. The bottom product may be recycled and introduced to the evaporation step or alternative may be recycled to the feed preparation step. The top product comprises a purified water stream that may be discharged. In an alternative advantageous embodiment according to the present invention, the bottom product from the first distillation column may be subjected to a polishing step before discharge such as an activated carbon filter or a membrane process such as reverse osmosis or nanofiltration or pervaporation step, or a treatment in a bioreactor such as a aerobic waste water treatment step instead of the second distillation column. The amount of purified water product to be discharged equals the amount of water entering the process with the feed stock and other additives. Typically, this corresponds to a concentration factor from about 1.1 and up to about 5 such as a concentration factor in the range 1.5 to 4. Further, the process water typically comprises high amount of electrolytes such as the homogeneous catalyst and may result precipitation and fouling problems and more frequent cleaning and maintenance this may be difficult to control in the system in FIG. 11. The combined evaporator and distillation embodiment is more robust and controllable. Hence, a recovery system comprising an evaporator with pH maintained in a predefined range generating water stream enriched in water phase liquid organic compounds and homogeneous catalysts from which a bleed stream is being withdrawn, and at least one distillation column for further treatment of the evaporated fraction from the evaporator comprises an advantageous embodiment of the present invention.

Figure 13:
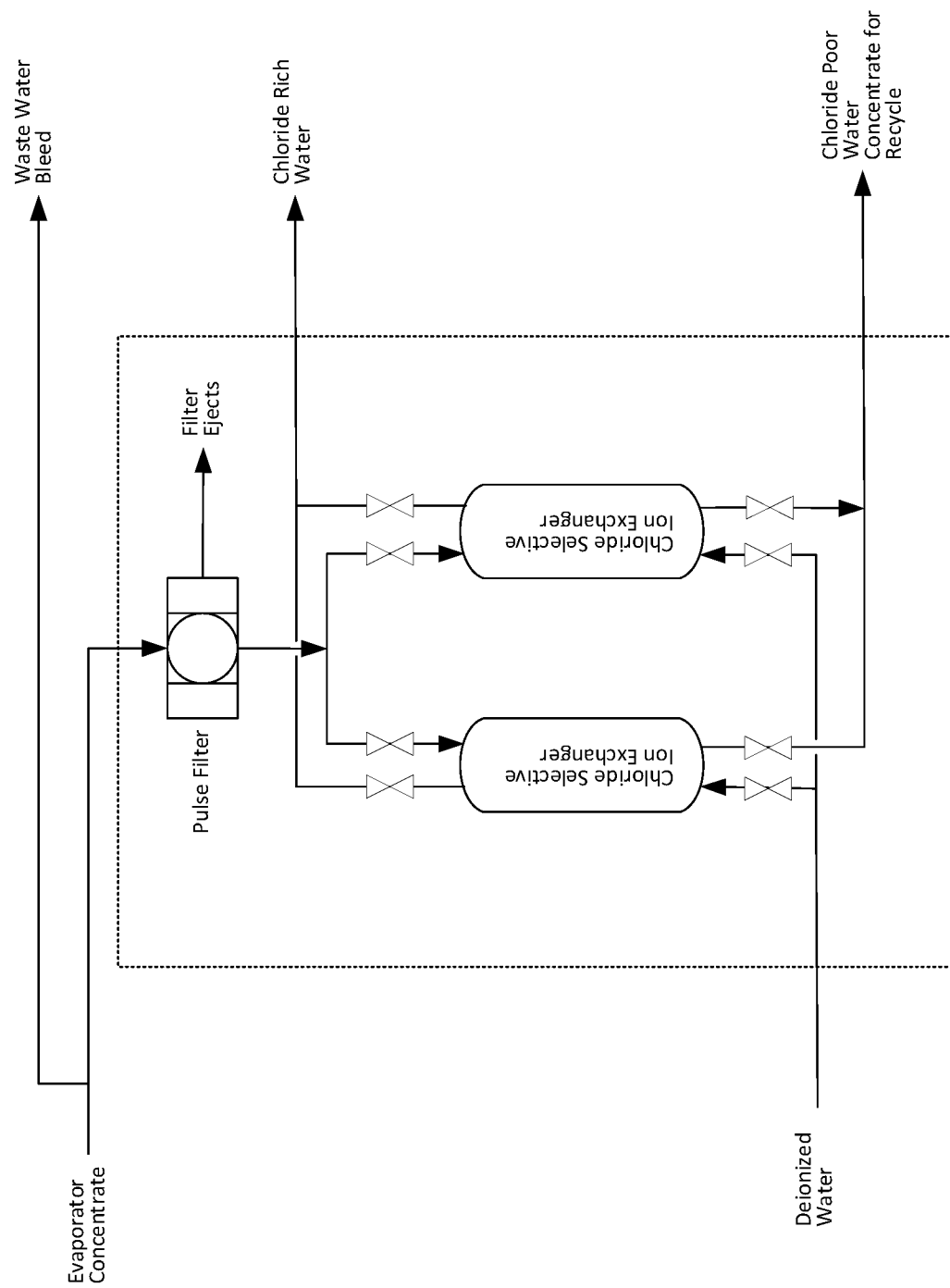
FIG. 13 shows a schematic overview of an advantageous bleed treatment system comprising a salt separation unit comprising a first filter and two fixed beds with chloride selective ion exchange resin.

FIG. 13 shows a schematic overview of an advantageous bleed treatment system comprising a salt separation unit comprising a first filter and two fixed beds with chloride selective ion exchange resin. The bleed stream withdrawn from the water stream enriched in water phase liquid organic compounds and homogenous catalysts in the form of potassium and sodium (the concentrate from the evaporator is first filtered in a filter to remove suspended particles and is subsequently fed to a chloride selective ion exchange step comprising at least two fixed beds filled with chloride selective ion exchange resin arranged in a parallel arrangement. A valve arrangement of shut off valves allows for taking a bed offline for cleaning/regeneration by a back flow or back flush with a cleaning fluid while being offline. Often the cleaning fluid comprises deionized water. Hereby continuous operation is ensured and chloride removal can be continued in the ion exchange bed(-s) being online while ion exchange bed(-s) being offline can be cleaned. Hereby a chloride poor water concentrate stream and a chloride rich water effluent stream are generated. The amount of chloride removal is according to the present invention adapted to provide a chloride removal corresponding to the amount of chloride entering the process with the carbonaceous feedstock. Typically, the chloride removal in said ion exchange step according to the present invention is at least 50% of the chlorides in the concentrated water phase entering said ion exchange step such as a chloride removal of at least 60%.

In many embodiments according to the present invention the chloride removal in said ion exchange step according to the present invention is at least 70% of the chlorides in the concentrated water phase entering said ion exchange step such as at least 80%. The chloride poor stream from said chloride ion exchange step is according to the present invention preferably recycled to the feed mixture preparation step 1 e.g. by mixing it with the remaining concentrate stream from the evaporator. The chloride rich water stream is discharged eventually after further cleaning. In many embodiments according to the present invention the amount of homogeneous catalyst(-s) in the form of potassium and/or sodium such as being retained in said chloride depleted outlet stream from said chloride ion exchange step is at least 70% by weight of the amount entering said chloride ion exchange step such as at least 80% by weight. Preferably, the amount of homogeneous catalyst(-s) in the form of potassium and/or sodium such as being retained in said chloride depleted outlet stream from said chloride ion exchange step is at least 85% by weight of the amount entering said chloride ion exchange step such as at least 90% by weight. Hereby, less make up homogeneous catalyst is required to be added in the pretreatment step 1, and an overall more efficient and economical process is obtained as further illustrated in examples.

Figure 14:
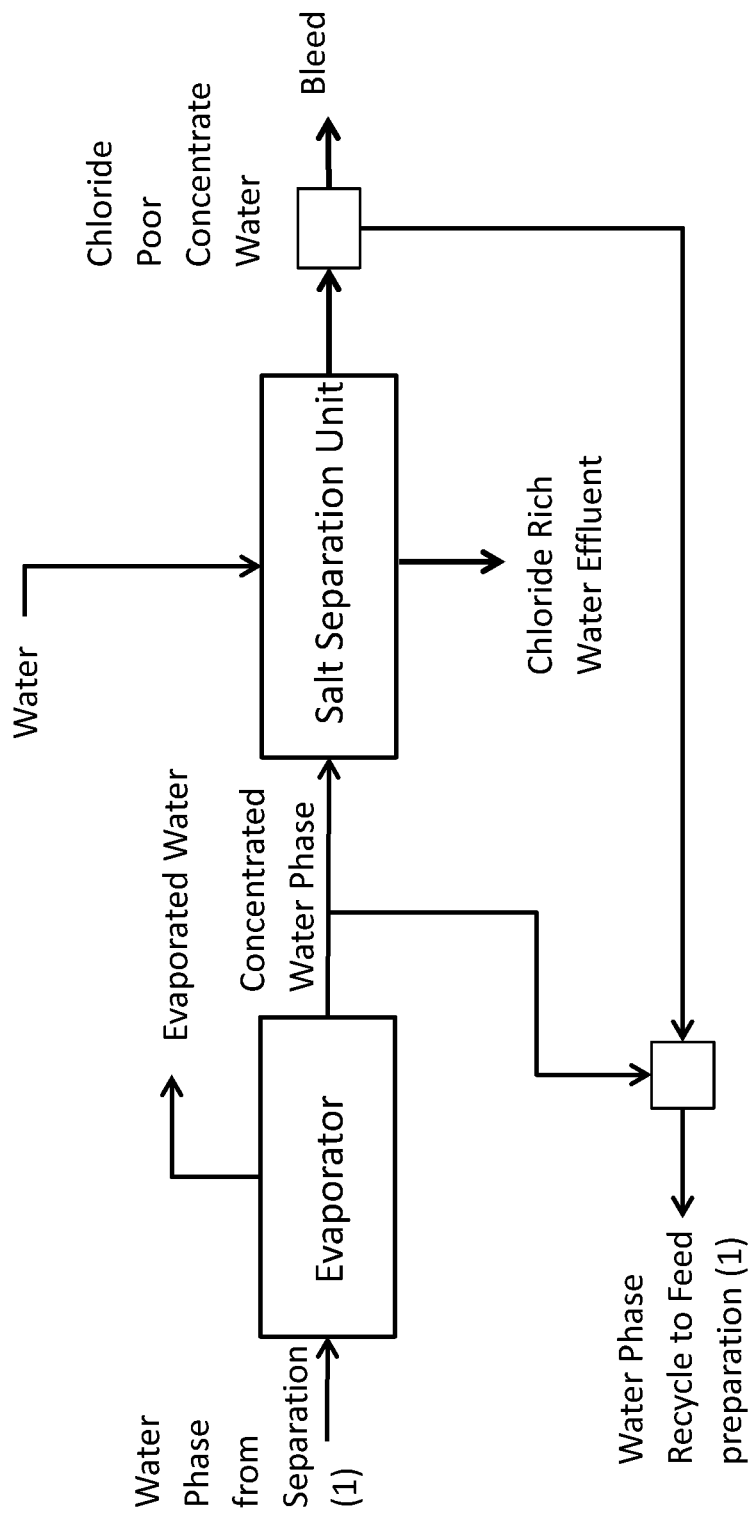
FIG. 14 shows a schematic overview of another advantageous embodiment of a recovery system comprising a salt separation unit comprising a first filter and two fixed beds with chloride selective ion exchange resin and where a further bleed stream is withdrawn from the chloride poor water stream exiting the salt separation unit.

FIG. 14 shows a schematic overview of another advantageous embodiment of a recovery system including a concentrate bleed stream treatment in a salt separation unit comprising a filtration for removal of particles and at least two fixed bed ion exchanger beds in parallel comprising a chloride selective ion exchange resin and a valve arrangement allowing for taking a ion exchanger bed off line for cleaning with a cleaning fluid, preferably being deionized water. As shown, the figure the concentrate bleed treatment further comprises a second bleed stream withdrawn from the chloride poor concentrate stream after salt separation unit. The second bleed stream is withdrawn in order to prevent build up of sodium in the system.

Example 1

Production of Water Concentrate

Energy wood (a mixture of mainly Scandinavian spruce, pine, birch including bark) having a moisture content of 36.6% by weight and a chloride content of 74 mg/kg was milled in a hammer mill to yield a maximum particle size of 1 mm, and mixed in a high shear rate mixer with recycled water concentrate including water phase liquid organic compounds, and homogeneous catalysts in the form potassium and sodium, recycled oil phase liquid organic compounds, make-up catalyst in the form of potassium carbonate, and sodium hydroxide to yield a feed mixture comprising:

| Ingredient | % by weight |
| --- | --- |
| Milled energy wood (dry) | 23.0 |
| Recycled oil phase liquid organic compounds | 23.0 |
| Water | 48.0 |
| Water phase liquid organic compounds | 4.44 |
| Potassium | 0.91 |
| Sodium | 0.65 |
| Chloride | 0.006 |

The feed mixture was converted in a continuous plant by pressurizing it to a pressure of 334 bar, and heating it to a temperature of 402° C. and maintaining the feed mixture at the conversion conditions for approximately 12 minutes before cooling it to 97° C., filtering it through a 500 um stainless steel straining, expanding and further cooling the converted feed mixture to ambient pressure and a temperature of 63° C. via a pressure reduction system comprising a series of tubular members and a further cooler, and separating the gas from the product in a degasser. The liquid phases was manually separated into an oil phase comprising oil phase liquid organic compounds, and a water phase comprising water phase liquid organic compounds and homogeneous catalysts in the water phase comprising water phase liquid organic compounds.

The water phase was subjected to a recovery process as shown in FIG. 10 where the concentration factor was about 2.2. The recovery system was operated in four different configurations as shown below in table 1. The concentrate shown is the combined concentrate for all four configurations.

TABLE 1

| Operating Mode/Parameter | Process water | Water Concentrate | Water Effluent | Water Effluent | Water Effluent | Water Effluent |
|---|---|---|---|---|---|---|
| Evaporator |  |  | X | X | X | X |
| Absorber |  |  | X | X | X |  |
| Coalescer |  |  |  | X | X |  |
| AC filter |  |  |  |  | X | X |
| pH | 8.8 | 10.2 | 8.7 | 9.2 | 8.2 | 7.8 |
| Na, g/l | 16 | 34 | <0.0005 | <0.0005 | <0.0005 | <0.0005 |
| K, g/l | 22 | 48 | <0.0005 | <0.0005 | <0.0005 | <0.0005 |
| Cl, mg/l | 155 | 340 | NA | NA | NA | NA |
| pH | 8.8 | 10.2 | 8.7 | 9.2 | 8.2 | 7.8 |
| TOC, g/l | 56 | 134 | 1.9 | 2.3 | 0.0019 | 0.0012 |
| Methanol, g/l | 6.2 | 0.75 | 1.7 | 2 | <0.2 | 0.0058 |
| Ethanol, g/l | 3.6 | 0.2 | 1.2 | 0.72 | <0.2 | 0.0011 |
| Acetone, mg/l | 370 | 6.7 | 39 | 20 | 0.78 | 0.79 |
| Phenols, mg/l | >20 | >8.5 | >25 | <0.42 | <0.0001 | <0.0001 |

As seen from table 2 almost complete recovery of potassium and sodium in the evaporator condensate is obtained. Further, it is seen that the majority of TOC remains in the concentrate (98.5%). However, the majority of the lighter components such as methanol, ethanol and acetone ends up in the evaporated fraction as seen from the table, and are only recovered in the configurations comprising the activated carbon filter. It was not possible to measure the concentration of in the process water and in the concentrate. However, as seen from the table phenols are significantly reduced by the alkaline absorber, and reduced below detection limit for the configurations comprising the activated filter.

Example 2

The water phase concentrate in example 1 was subjected to a bleed treatment system as shown in FIG. 13 with the results shown in table 2.

TABLE 2

| Process water | Concentrate | Cleaning Water | Chloride poor stream | Chloride rich stream |
|---|---|---|---|---|
| Flow % | 100 | 120 | 100 | 120 |
| Na, g/l | 72.0 | 0 | 67.6 | 3.8 |
| K, g/l | 48.0 | 0 | 44.7 | 2.8 |
| Cl, g/l | 340 | 0 | 67 | 227 |
| pH | 10.2 | NA | NA | NA |

As seen from the table the chloride removal is about 80%, and the recoveries of potassium and sodium were 93.2 and 93.3% respectively. The distribution of TOC in the different streams was not measured. It should be noticed that whereas the bleed treatment system can control the chloride concentration other compounds such as sodium may accumulate if the process is process is configured as shown I FIG. 13 without a further bleed stream withdrawn as shown in FIG. 14, and further exemplified below in example 3.

Example 3

Bleed Requirements

Table 3 compares the bleed requirements to prevent accumulation of trace elements and potassium and sodium make up rates based on the data in example 1 and 2 and a chloride threshold of 400 mg/l in the concentrate for the bleed withdrawn without and with bleed treatment with chloride selective ion exchange according to FIG. 14.

TABLE 3

|  | Without bleed treatment | With bleed treatment |
|---|---|---|
| Conc. Water Purge Rate required, % | 15.0 | 5.9 |
| Chloride Conc. in Conc Water Stream, ppm | 400 | 377 |
| Catalyst Make-up Rate, % | 15.0 | 5.9 |
| Base Make-up Rate, % | 15.0 | 5.9 |

As seen from table 3, the bleed requirements and thereby also the make-up requirements of potassium and base is significantly reduced by the bleed treatment. These represents make up major operating costs streams. Further as the bleed requirements are reduced also the amount of water phase liquid organic compounds being recycled to the feed preparation is increased and thereby the overall oil yield is increased.

The invention claimed is:

1. A method comprising:
   processing a feed mixture comprising one or more carbonaceous materials at a pressure of from greater than 150 bar to about 400 bar and a temperature from about 300° C. to about 430° C. in the presence of homogeneous catalysts in the form of potassium and/or sodium in a concentration of at least 0.5% by weight of the feed mixture and liquid organic compounds in a concentration from about 5% to about 40% by weight of the feed mixture in a predefined time thereby producing a converted feed mixture;
   cooling and depressurizing the converted feed mixture to a temperature in a range of from 50° C. to 250° C. and a pressure in a range of from 1 to 150 bar, respectively;
   separating the cooled and depressurized converted feed mixture is separated in to into:
   a gas phase comprising carbon dioxide, hydrogen, and methane,
   an oil phase comprising oil phase liquid organic compounds, and
   a water phase comprising water phase liquid organic compounds and dissolved homogeneous catalysts comprising potassium and/or sodium;

at least partly recovering the water phase liquid organic compounds and dissolved homogenous catalysts comprising potassium and/or sodium from said water phase thereby producing a first water phase stream enriched in water phase liquid organic compounds and dissolved homogeneous catalysts comprising potassium and/or sodium, and a second water phase stream depleted in water phase liquid organic compounds and dissolved homogeneous catalysts comprising potassium and/or sodium; and at least partly recycling the first water phase stream to the feed mixture to provide at least part of said water phase liquid organic compounds and dissolved homogeneous catalysts in the feed mixture, wherein a bleed stream is withdrawn from said first water phase stream prior to said at least partly recycling step, wherein the bleed stream is further treated in one or more ion exchange steps, and wherein said one or more ion exchange steps comprises one or more ion exchange resins contained in at least two fixed beds in a parallel arrangement with shut off valves prior and after each fixed bed so that at least one fixed bed is online and allowing for taking at least one fixed bed offline for cleaning while allowing for continuous operation.

2. The method according to claim 1, wherein an amount of bleed stream being withdrawn is selected so as to obtain a concentration of chloride in the feed mixture of less than 600 ppm by weight.

3. The method according to claim 1, wherein the concentration of chloride in the first water phase stream is less than 250 ppm by weight.

4. The method according to claim 1, wherein an weight ratio of said bleed stream being withdrawn to the first water phase stream is in a range of from 0.01 to 0.4.

5. The method according to claim 1, wherein the one or more ion exchange resins comprise a chloride selective resin.

6. The method according to claim 5, wherein the fixed beds are equipped with a valve arrangement allowing for regeneration and/or cleaning of said fixed beds by providing a back flow and/or a back flush with a cleaning fluid while being offline.

7. The method according to claim 6, wherein the cleaning fluid comprises demineralized water.

8. The method according to claim 1, wherein the bleed stream is filtered to remove suspended particles prior to entering said one or more ion exchange steps.

9. The method according to claim 1, wherein a pH of the bleed stream prior to being treated in the one or more ion exchange steps is maintained in a range of from 8 to 14.

10. The method according to claim 1, wherein the liquid organic compounds in said feed mixture comprises recycled oil phase liquid organic compounds.

11. The method according to claim 1, wherein the converted feed mixture is depressurized to a pressure in a range of from 10 to 50 bar prior to said separation.

12. The method according to claim 1, wherein the water phase comprises water phase liquid organic compounds having a boiling point lower than water and water phase liquid organic compounds having a boiling point higher than water.

13. The method according to claim 12, wherein the water phase liquid organic compounds comprises one or more components selected from one or more of the groups:
  a. Ketones;
  b. Alcohols and poly-alcohols;
  c. Phenols, alkylated phenols, poly-phenols, monomeric and oligomeric phenols, creosol, thymol, alkoxy phenols, p-coumaryl alcohol, coniferyl alcohol, sinapyl alcohol, flavenols, and catechols;
  d. Carboxylic acids;
  e. Furans; and
  f. Alkanes, alkenes, toluene, and cumene.

14. The method according to claim 13, wherein a concentration of individual water phase liquid organic compounds in the water phase is less than 2.0% by weight.

15. The method according to claim 1, wherein the water phase liquid organic compounds comprises emulsified droplets of the oil phase.

16. The method according to claim 1, wherein the at least partly recovering the water phase liquid organic compounds and dissolved homogenous catalysts comprising potassium and/or sodium from the water phase comprises one or more techniques selected among evaporation, distillation and/or fractionation, reverse osmosis, nanofiltration, ultrafiltration and pervaporation.

17. The method according to claim 16, where the at least partly recovering the water phase liquid organic compounds and dissolved homogenous catalysts comprising potassium and/or sodium from the water phase comprises one or more evaporation and/or distillation steps thereby providing the first water phase stream and the second water phase stream, where the amount of the second water phase stream produced corresponds to an amount of water entering a high pressure processing system producing the converted feed mixture.

18. The method according to claim 17, wherein the water phase is filtered so as to remove suspended solid particles prior to entering said one or more evaporation and/or distillation steps.

19. The method according to claim 17, wherein the one or more evaporation and/or distillation steps comprises one or more flash steps.

20. The method according to claim 17, wherein a pH of the water phase is maintained at alkaline conditions.

21. The method according to claim 20, wherein said maintaining at alkaline conditions comprises measuring and adjusting the pH by adding sodium hydroxide to the water phase.

22. The method according to claim 19, wherein the one or more evaporation and/or distillation steps utilizes at least one evaporator.

23. The method according to claim 17, wherein the one or more evaporation and/or distillation steps produce an evaporated vapor, and further comprise condensing the evaporated vapor in at least two condensation steps, wherein the at least two condensation steps decrease the temperature of the evaporated vapor.

24. The method according to claim 23, where the evaporated vapor passes a demister and/or a coalescer prior to said at least two condensation steps.

25. The method according to claim 23, where the evaporated vapor is contacted with an absorbent in an absorber prior to said at least two condensation steps.

26. The method according to claim 25, where the absorbent comprises an alkaline absorbent.

27. The method according to claim 26, where the absorbent comprises sodium hydroxide.

28. The method according to claim 16, wherein the one or techniques comprise distillation, and wherein said distillation is performed in one or more distillation columns, each equipped with a stripping and a rectifying section.

29. The method according to claim 1, wherein the separation of the cooled and depressurized converted feed mixture is performed in a first phase separator operating at a temperature of 50° C. to 250° C., wherein the oil phase from the first phase separator is further purified by mixing it with one or more washing agents, and wherein the oil phase is separated from the one or more washing agents in a second phase separator operating at a temperature of 50° C. to about 250° C.

30. The method according claim 29, wherein the first and/or second phase separator operates at a pressure in a range of from 10 to 100 bar.

31. The method according to claim 29, further comprising subjecting the oil phase separated in the second phase separator and/or the one or more washing agents separated in the second phase separator to one or more flash distillation steps.

32. The method according to claim 31, wherein the separation further comprises a second washing step, wherein the separated oil phase from the second phase separator is mixed with one or more further washing agents and separated from the one or more further washing agents in a third separator located between the second phase separator and one or more flash distillation steps.

33. The method according to claim 29, wherein one or more streams comprising water are withdrawn from the second phase separator and/or a third phase separator and/or the flash distillation step and mixed with the water phase from the first phase separator.

34. The method according to claim 1, wherein said one or more carbonaceous materials are selected from
   biomass;
   agricultural products and by products;
   empty fruit bunches from palm oil production, palm oil manufacturers effluent (POME), and/or residues from sugar production;
   energy crops;
   aquatic biomass; and
   at least one of vegetable oil production, sorted municipal solid waste, source sorted household wastes, restaurant wastes, slaughter house waste, sewage sludge, plastics and any combination thereof.

* * * * *